United States Patent [19]
Watanabe et al.

[11] Patent Number: 5,697,682
[45] Date of Patent: Dec. 16, 1997

[54] BRAKE PRESSURE CONTROLLING APPARATUS

[75] Inventors: Takashi Watanabe, Nagoya; Naohiko Tsuru, Handa; Shoichi Masaki, Chiryu, all of Japan

[73] Assignee: Nippondenso Co., Ltd., Kariya, Japan

[21] Appl. No.: 655,096

[22] Filed: Jun. 4, 1996

[30] Foreign Application Priority Data

Jun. 5, 1995 [JP] Japan ............................... 7-138067
Apr. 8, 1996 [JP] Japan ............................... 8-085523

[51] Int. Cl.⁶ .................................................. B60T 8/48
[52] U.S. Cl. ........................................ 303/169; 303/DIG. 2
[58] Field of Search .......................... 303/9.71, 10, 11, 303/149, 150, 155, 157, 158, 169, 113.1–113.2, 113.5, 116.1–116.2, 119.1, DIG. 1–4

[56] References Cited

U.S. PATENT DOCUMENTS

| | | | |
|---|---|---|---|
| 5,178,442 | 1/1993 | Toda et al. | 303/116.1 |
| 5,295,738 | 3/1994 | Matsuura et al. | 303/158 |
| 5,498,071 | 3/1996 | Oikawa et al. | 303/149 |

FOREIGN PATENT DOCUMENTS 2-182561  7/1990  Japan.
3-284458  12/1991  Japan.

*Primary Examiner*—Josie Ballato
*Attorney, Agent, or Firm*—Cushman, Darby & Cushman IP Group of Pillsbury Madison & Sutro LLP

[57] ABSTRACT

A brake pressure control device is capable of realizing reduction in a braking distance of a vehicle by promoting control in decreasing brake pressure applied on wheel braking force generating members such as wheel cylinders or a response function in increasing the brake pressure applied on the wheel braking force generating members in generating braking force on wheels. When there is a pressure difference between wheel cylinders, a reservoir control valve is brought into a blocking state and two control valves are brought into a communicating state by which pressure of the brake fluid is shifted from a wheel cylinder on high pressure side to a wheel cylinder on the low pressure side, by which the pressure of the wheel cylinder on the high pressure side can be decreased by only shifting the brake fluid between the wheel cylinders without making the brake fluid flow into a reservoir and accordingly, a relative time by which the reservoir becomes full is retarded and the response function in increasing the pressure of the brake fluid can be enhanced by that amount.

26 Claims, 10 Drawing Sheets

BRAKE PRESSURE CONTROLLING APPARATUS

CROSS-REFERENCE TO RELATED APPLICATIONS

The present application is related to and claims priority from Japanese Patent Application Nos. Hei. 7-138067 and 8-85523, incorporated herein by reference.

BACKGROUND OF THE INVENTION

1. Field of the Invention

The present invention relates to a brake pressure controlling apparatus capable of shortening a vehicle braking distance when braking a vehicle by maintaining a slip state of wheels to be as optimal as possible.

2. Description of Related Art

A brake system of a vehicle is constituted by connecting a master cylinder connected to a brake pedal, wheel cylinders provided in a brake mechanism of wheels and a reservoir storing brake fluid by respective pipings. When the slip state of wheels exceeds a predetermined amount, anti-skid control is performed by controlling the system to increase or decrease brake pressure applied to the wheel cylinders. Pressure decreasing control for the wheel cylinders in the anti-skid control is performed by letting the brake fluid in the wheel cylinders flow into the reservoir.

Generally, the brake fluid stored in the reservoir is often recirculated to the master cylinder side by drawing the brake fluid stored in the reservoir therefrom by a pump. However, it has been conceived that the pump may be omitted to simplify the apparatus, reduce cost and the like and the brake fluid stored in the reservoir is recirculated to the master cylinder side by a pressure decrease in the master cylinder caused by release of depression of the brake pedal (for example, in Japanese Laid-Open Patent Publication No. Hei 2-182561).

However, according to the above-mentioned anti-skid controlling apparatus wherein the pump is omitted but the reservoir is provided, the brake fluid cannot be drawn forcibly from the reservoir by a pump in the midst of control and therefore, if the reservoir becomes full, the brake fluid cannot be made to flow thereinto any longer and the pressure decreasing control of the wheel cylinders cannot be carried out. Therefore, the controllable time period of the anti-skid control is shortened. Also, the amount of the brake fluid which can be drawn from the wheel cylinders is restricted by the storage capacity of the reservoir. Accordingly, a decisive pressure decreasing control or the like cannot be performed and as a result the flexibility of the anti-skid control is diminished.

Such a problem is similarly caused even when a pump drawing the brake fluid from the reservoir is provided so far as the capacity thereof is low. That is, in the case where the capacity of pump is low and an amount of the brake fluid flowing from the wheel cylinder side is more than an amount drawn from the reservoir, the reservoir becomes full at an early stage which shortens the controllable time of the anti-skid control and diminishes the flexibility of control. Therefore, the shortening of the vehicle braking distance may not be achieved sufficiently since the state of controlling the wheels at an optimum slip rate by the anti-skid control may be reduced.

Further, according to an anti-skid control, a pressure decreasing control is performed for wheel cylinders having high wheel cylinder pressure and a pressure increasing control is carried out for wheel cylinders having low wheel cylinder pressure in accordance with, for example, a change in road conditions. In this case, the brake fluid from the wheel cylinders for the pressure decreasing control of which pressure is controlled to decrease is normally stored in the reservoir.

That is, when the brake fluid originally having high brake pressure is stored in the reservoir, its pressure is dropped to around several atmospheres. Also, when the pressure increasing control is conducted for the wheel cylinder having low wheel cylinder pressure by discharging the brake fluid in the reservoir to the wheel cylinder side by drawing it by a pump, etc., it is necessary to again increase the pressure of the brake fluid which has been dropped to around several atmospheres through the use of a pump. In this case, the procedure of dropping the pressure from a high value to around several atmospheres and thereafter increasing it may retard the response with regard to increasing the wheel cylinder pressure.

Therefore, for example, the provision of the optimal slip state in accordance with the road situation may not be carried out sufficiently precisely. Also, in the case of increasing one wheel cylinder pressure by using the brake fluid stored in the reservoir and having only several atmospheres which is produced by decreasing the brake pressure applied on the other of the wheel cylinders during a time period in which the brake fluid is being stored into the reservoir, due to the wheel braking force at the wheel on the side of the wheel cylinder of which pressure has been decreased, the braking force applied on the vehicle body is reduced before the pressure decrease.

On the other hand, on the side of the wheel cylinder of which pressure is being increased which is expected to provide a large vehicle braking force, the brake pressure has not been increased yet. That is, when the brake fluid is being stored in the reservoir, the braking force applied on the vehicle is temporarily decreased and the maximum wheel braking force is not achieved.

SUMMARY OF THE INVENTION

In view of the above-described problems of the prior art, it is a first object of the present invention to provide a brake pressure controlling apparatus capable of realizing further reduction of a vehicle braking distance by promoting a response function in controlling the decrease in brake pressure applied on wheel braking force generating members such as wheel cylinders or controlling the increase in brake pressure applied on the wheel braking force generating members in generating braking forces on wheels.

Also, it is another object of the present invention to provide a brake pressure controlling apparatus capable of shortening a vehicle braking distance by prolonging as much as possible controllable time in controlling a decrease in pressure applied on vehicle braking force generating members by restraining an amount of brake fluid flowing into a reservoir with respect to an apparatus having a reservoir.

To solve the above problem, according to a first aspect of the present invention, a braking system includes a brake pressure controlling apparatus including a prohibiting member provided in a piping system for prohibiting flow of a brake fluid from a brake pressure generating member to first and second wheel braking force generating members while a pressure increase and decrease controlling unit is controlling brake pressure applied on at least one of the first and the second wheel braking force generating members.

The system also includes a pressure increasing unit for increasing the brake pressure applied on the first wheel braking force generating member by shifting the brake fluid from a side of the second wheel braking force generating member to a side of the first wheel braking force generating member in an intermediary of the piping system from the prohibiting member to the first and the second wheel braking force generating members. This is done in a state where the brake pressure applied on the first wheel braking force generating member is lower than the brake pressure applied on the second wheel brake force generating member by a predetermined amount of pressure by operating the pressure increase and decrease controlling unit.

In this case, it is assumed that a pressure differential is created between the brake pressures applied on the first and the second wheel braking force generating members by the operation of, for example, the pressure increase and decrease controlling unit and, for example, the brake pressure applied on the first wheel braking force generating member is lower than the brake pressure applied on the second wheel braking force generating member by a predetermined amount of pressure.

Under such a state, according to the present invention, when the brake pressure applied on the first wheel braking force generating member is increased, the increasing of the brake pressure applied on the first wheel braking force generating member can be carried out with good response performance by shifting the brake fluid having high brake pressure applied on the second wheel braking force generating member. Therefore, the wheel braking force can be precisely increased and the degree of deceleration of the wheels can be enhanced. Incidentally, the pressure increasing unit may be implemented as a controlling unit in the pressure increase and decrease controlling unit.

According to a second aspect of the present invention, the pressure increasing unit is operated by controlling a control valve constituting the pressure increase and decrease controlling unit from a blocking state to a communicating state. In this way the pressure increasing unit can be realized without adding a new constituent by, for example, utilizing the control valve which is a constituent for carrying out the anti-skid control. According to a third aspect of the present invention, first and second control valves may respectively be used for the first and the second wheel braking force generating members.

According to a fourth aspect of the present invention, when the pressure increase and decrease controlling unit is provided with a reservoir, in operating the pressure increasing unit, a prohibiting member for the reservoir prohibits brake fluid from flowing from the respective wheel braking force generating members to the reservoir. In this way, by prohibiting the flow of the brake fluid to the reservoir, the brake fluid is directly shifted from the wheel braking force generating member having high brake pressure to the wheel braking force generating member having low brake pressure. Therefore, an amount of the brake liquid stored in the reservoir is reduced and, for example, a situation where the reservoir becomes full and the pressure cannot be decreased any more in the anti-skid control can be avoided as much as possible. Also, a time period permitting the anti-skid control can be prolonged even if a discharging unit for discharging the brake fluid stored in the reservoir is not provided, or the discharging capacity is low since a time until the reservoir becomes full relative to that in the conventional case can be retarded.

According to fifth and a sixth aspects of the present invention, a pump drawing and discharging the brake fluid stored in the reservoir may be provided. When the brake fluid is discharged to the side of the wheel braking force generating members by the pump, kickback felt by a passenger can be reduced in the case of, for example, a brake pressure apparatus having a brake pedal that is controlled to operate in order to generate vehicle braking force. Also, it is possible to adopt a pump having a low pump discharging capacity compared with that in the case where the liquid is discharged to the brake pressure generating members.

According to seventh through tenth aspects of the present invention, when the pressure increase and decrease controlling unit controls an increase the pressure of the first wheel braking force generating member and controls a decrease in the pressure of the second wheel braking force generating member, if the pressure increasing unit is operated, the brake pressures respectively applied on the first and second wheel braking force generating members can simultaneously be controlled and the wheel braking force can be achieved for the respective wheels with good response performance. Also, if the pressure of the wheel cylinder on the pressure increasing side is increased by utilizing the brake pressure of the brake liquid at the wheel cylinder on the pressure decreasing side for the pressure reduction, time lag in shifting the brake pressure applied on the respective wheel cylinders can be minimized and the braking force applied on the vehicle can be maintained at an approximately constant level.

According to an eleventh aspect of the present invention, when the pressure increase and decrease controlling unit has decreased pressure on one of the first and the second wheel braking force generating members and thereafter reduces the pressure of the other wheel braking force generating member, in reducing the brake pressure applied on the other wheel braking force generating member, the brake pressure applied on the one wheel braking force generating member may be increased by utilizing high brake pressure applied on the other wheel braking force generating member. This is because it is possible that in reducing the pressure of the wheel braking force generating member, the brake pressure applied to the wheel braking force generating member is lower than a hydraulic pressure corresponding to a peak road coefficient of friction μ and accordingly, it can be increased to a road μ (friction coefficient) peak hydraulic pressure and the brake pressure is comparatively low and accordingly, it can be determined that control communicating the wheel braking force generating members with each other can be carried out.

According to a twelfth aspect of the present invention, a determining unit for determining whether a difference between the brake pressures of the respective wheel braking force generating members is caused may be provided.

According to thirteenth through sixteenth aspects of the present invention, the determining unit determines the generation of the pressure difference by a pressure decrease control state by the pressure increase and decrease controlling unit. For example, it can be determined by control states of the first and the second control valves controlled by the pressure increase and decrease controlling unit, or a pressure increase or decrease state of brake pressure applied on the wheel braking force generating members controlled by the pressure increase and decrease controlling unit. If the permission of operating the pressure increasing unit is determined based on the determination with respect to the pressure difference, for example, a situation further requesting response performance with regard to increase of brake pressure applied on the wheel braking force generating members, a situation requesting that an amount of brake fluid stored in a reservoir be restrained as much as possible, etc. can precisely be determined.

According to a seventeenth aspect of the present invention, a road coefficient of friction change determining unit determining occurrence of road coefficient of friction change in which a road for running a vehicle is shifted from a road having a predetermined low friction coefficient to a road having a predetermined high friction coefficient, is provided and when the occurrence of the road coefficient of friction change is determined by the road coefficient of friction change determining unit in operating the pressure increase and decrease controlling unit, the first wheel braking force generating member is communicated with the second wheel braking force generating member.

This is the most pertinent to the control of shifting the brake fluid by communicating the wheel braking force generating members with each other in this way since the brake pressure applied on the wheel braking force generating members is firmly lower than the hydraulic pressure corresponding to the road coefficient of friction peak when the road for running a vehicle is shifted from one having a low μ to one having a high μ. Further, in such a case, according to an eighteenth aspect of the present invention, the road coefficient of friction change determining unit may determine that the road coefficient of friction change occurs when the pressure increase with respect to the wheel braking force generating members in the pressure increasing control is more than a predetermined pressure increase.

That is, for example, it is conceivable that the road coefficient of friction is directly detected by a road coefficient of friction sensor, or the pressure increase control by the pressure increase and decrease controlling unit is adjusted to realize by less than a predetermined pressure increase pulse number with respect to a road having predetermined uniform friction resistance and the road coefficient of friction determining unit determines that the road coefficient of friction change occurs when a pressure increase pulse number in the pressure increasing control with regard to the wheel braking force generating member is the predetermined pressure increase number or more.

In the latter case, the road coefficient of friction is not directly detected by a separate road coefficient of friction sensor, etc., but indirectly determined based on data used in the pressure increasing and decreasing control. This is because when the pressure increasing control is adjusted so that the pressure increasing control is executed at less than a predetermined pressure increasing pulse number and it is shifted to pressure decreasing control on a road having predetermined uniform friction resistance, if a desired pressure increase cannot be realized even if the pressure increase pulse number is equal to or more than the predetermined pressure increase pulse number, it is due to the elevation of the hydraulic pressure corresponding to the road coefficient of friction peak and the occurrence of the road coefficient of friction change can be determined.

Incidentally, when the above-mentioned pressure increasing unit is applied to a system of X-piping, the first wheel on the side of the first wheel braking force generating member and the second wheel on the side of the second wheel braking force generating member can be applied respectively to a front wheel and a rear wheel. For example, an optimum brake pressure corresponding to a change of road reaction accompanied by load shift generated in accordance with vehicle braking can be applied by which response performance in pressure increasing in this case can be secured. Therefore, restriction of a pitching rate occurring in a vehicle body in deceleration of the vehicle in correspondence with vehicle braking force can be realized.

According to a twentieth aspect of the present invention, a road state difference determining unit for determining whether a difference of road states under a first wheel and a second wheel is reversed may be provided. In this case if the road state difference determining unit determines positively in executing control by the pressure increase and decrease controlling unit, the first wheel control force generating member may be communicated with the second wheel braking force generating member.

That is, if the road states under the first wheel and the second wheel are reversed, it is expected that the wheel originally under pressure increasing control is shifted to pressure decreasing control and the wheel originally under pressure decreasing control is shifted to pressure increasing control. If the first and the second wheel braking force generating members are communicated under this situation, the pressure increasing and the pressure decreasing can simultaneously be performed by which the response performance can be promoted. Further, if a reservoir storing brake fluid for pressure reduction is included in the device performing such a control, the amount of brake fluid flowing into the reservoir can be decreased.

According to twenty-first through twenty-third aspects of the present invention, if the detection of the reversal of road states is determined by a difference between a behavior of the first wheel and a behavior of the second wheel, that is, a wheel speed or a wheel slip rate thereof, the reversal of road states can simply be detected by, for example, also using a wheel speed sensor in the anti-skid control apparatus constituting the pressure increase and decrease controlling unit.

According to a twenty-fourth aspect of the present invention, the road state difference determining unit may predict the reversal from shift of loads applied on the respective wheels. That is, when the load shift is caused, the reaction of the road to the respective wheels is changed and a road reaction combination is changed. Such a load shift may be predicted by, for example, a pivoting state corresponding to steering operation of a passenger.

In the above-mentioned aspects of the present invention, the pressure increasing unit increases the brake pressure applied on the wheel braking force generating member having low brake pressure by shifting the brake fluid from the wheel braking force generating member having high brake pressure to the wheel braking force generating member having low brake pressure. However, according to a twenty-fifth aspect of the present invention, for example, in a state where a pressure difference is caused by the pressure increase and decrease controlling unit between the brake pressure applied on the first braking force generating member and the brake pressure applied on the second wheel braking force generating member in simply operating the pressure increase and decrease controlling unit, a pressure increasing unit increasing the brake pressure applied on one of the wheel braking force generating members by high brake pressure applied on the other one thereof may be provided.

According to a twenty-sixth aspect of the present invention, an anti-skid controlling unit performs pressure increase and decrease control of brake fluid pressure applied on wheel cylinders (hereinafter, wheel cylinder pressure) when a slip state of wheels is a predetermined amount or more. In the case of increasing the wheel cylinder pressure, for example, it can be realized by letting brake fluid supplied from a master cylinder flow into the wheel cylinders by depression of a brake pedal by a passenger. Further, in the case of decreasing the wheel cylinder pressure, it can be realized by recirculating the brake fluid in the wheel cylinders to a reservoir.

Although the anti-skid control is performed by conducting the increase and decrease control of the wheel cylinder pressure in this way, for example, if there is no pump for drawing the brake fluid from the reservoir, the brake fluid cannot be forcibly drawn from the reservoir by pump during the control operation and if the reservoir is full, the brake fluid cannot be made flow thereinto any more by which the control of decreasing the wheel cylinder pressure cannot be carried out. Also, the amount of the brake fluid which can be drawn from the wheel cylinders is restricted by the storing capacity of the reservoir and therefore, a decisive pressure decreasing control, etc., cannot be carried out, and as a result, the freedom of the anti-skid control is diminished. However, in the present invention, in the case where the determining unit determines a state where a pressure difference is present between the brake pressures applied on the first wheel cylinder and the second wheel cylinder, the anti-skid controlling unit makes the first and the second control valves communicate with each other after blocking the control valve for the reservoir and thereby makes the first and the second wheel cylinders communicate by which the brake fluid is shifted from the wheel cylinder on the high pressure side to the wheel cylinder on the low pressure side. If the pressure of the wheel cylinder on the high pressure side can be controlled to decrease only by shifting the brake fluid between the wheel cylinders without making the brake fluid flow into the reservoir in this way, a time period by which the reservoir becomes full can be prolonged relative to that in the conventional case and the controllable time of the anti-skid control can be prolonged for that amount. Also, compared with the case where the pressure of the wheel cylinder on the low pressure side is increased by using the brake fluid which has been stored in the reservoir of which pressure has been decreased to around several atmospheric pressure and by, for example, drawing by a pump, the pressure increase of wheel cylinder on the low pressure side is performed by flow of the brake fluid having high wheel cylinder pressure in synchronism with the pressure decrease of the wheel cylinder on the high pressure side. Accordingly, the pressure increase of the wheel cylinder on the low pressure side can be realized with improved response performance.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
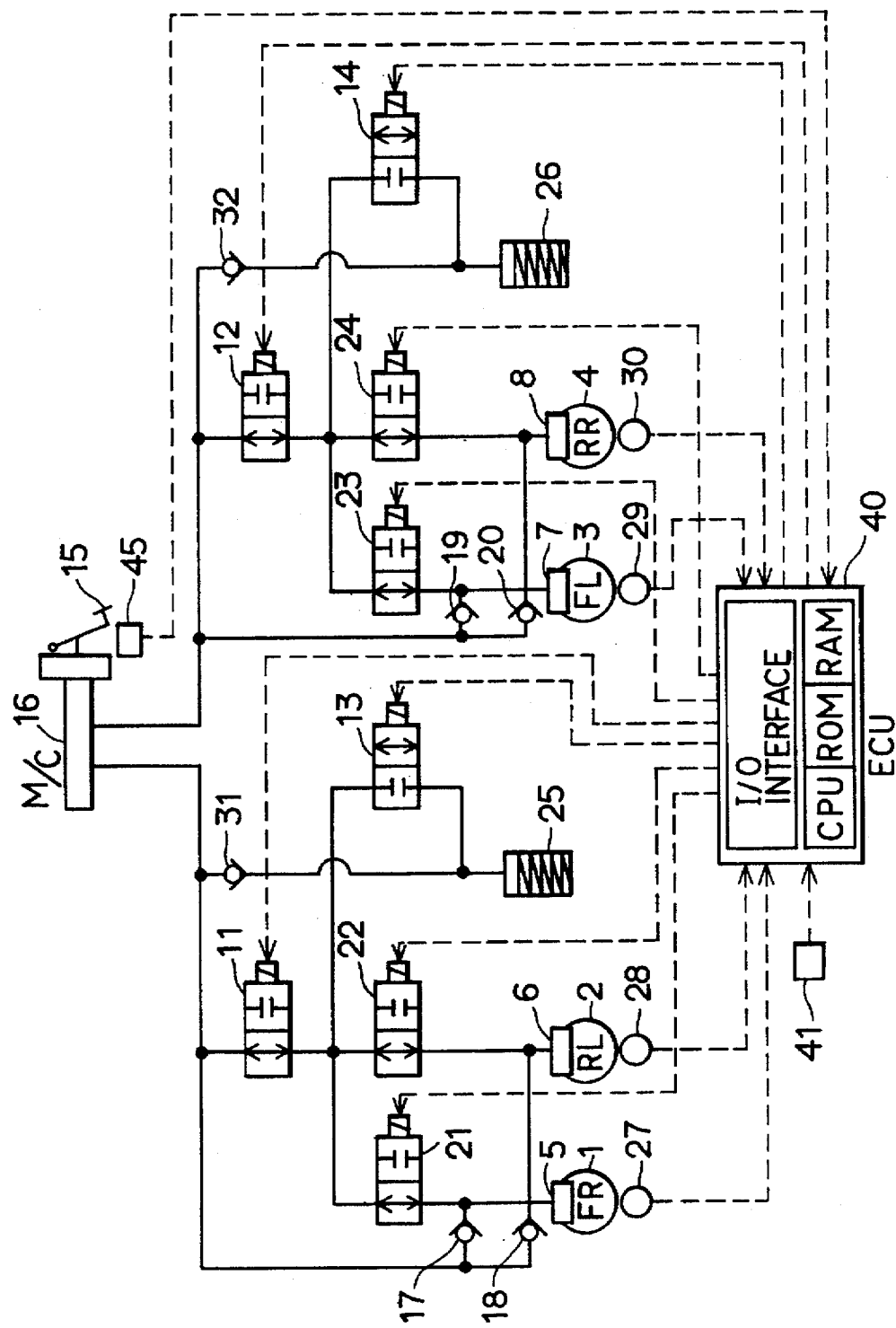
FIG. 1 is an outline explanatory view showing the system constitution of a first embodiment of the present invention.

FIG. 1 shows the system constitution of an anti-skid control apparatus that according to a first embodiment of the present invention. The first embodiment is an example where the present invention is applied to a front engine, front wheel drive four-wheeled vehicle. In FIG. 1 there are two brake piping routes of vehicle, a route of a right front wheel and a left rear wheel and a route of a left front wheel and a right rear wheel.

Wheel speed sensors 27–30 which are electromagnetic, magnetoresistive or the like are respectively arranged at the right front wheel 1, left rear wheel 2, left front wheel 3 and right rear wheel 4, and the sensors output pulse signals of frequencies in accordance with rotation of the respective wheels 1 through 4. Hydraulic brake devices as wheel braking force generating members (hereinafter, wheel cylinders) 5–8 are arranged at the respective wheels 1–4 for generating braking force on the respective wheels 1–4. Master cylinder pressure from a master cylinder 16 generated by depression of a brake pedal 15 is propagated towards a first master pressure cut-off valve 11 and a second master pressure cut-off valve 12 via respective pipings. The first and the second master pressure cut-off valves 11 and 12 are constituted as prohibiting members prohibiting flow of brake fluid from the master cylinder 16 to the respective wheel cylinders 5 through 8, and the master cylinder 16 is constituted as a brake fluid pressure generating member generating brake pressure (master cylinder pressure) by operating the brake pedal 15 through which a braking operation by a passenger is conducted. Depression of the brake pedal 15 is detected by a stop switch 45. An ON signal is outputted during braking and an OFF signal is outputted during non-braking from the stop switch 45.

When anti-skid control is not carried out, the first and the second master pressure cut-off valves 11 and 12 are brought into a communicating state and the pressure of the master cylinder is transmitted to control valves 21–24 respectively corresponding to the wheels 1–4 via the respective master pressure cut-off valves 11 and 12. The control valves 21–24 are brought into a communicating state when anti-skid control is not carried out and therefore, the master cylinder pressure is transmitted to the wheel cylinders 5–8 in accordance with depression of the brake pedal 15 by a passenger. Normally, the master cylinder 16 has a reservoir of its own (not shown).

Reservoirs 25 and 26 of brake fluid are connected to a line connecting the master pressure cut-off valve 11 and the control valves 21 and 22 and a line connecting the master pressure cut-off valve 12 and the control valves 23 and 24 respectively via reservoir control valves 13 and 14. The reservoir control valves 13 and 14 are for controlling flow-in and flow-out of brake fluid to and from the reservoirs 25 and 26. The reservoirs 25 and 26 are also connected to lines between the first and the second master pressure cut-off valves 11 and 12, and the master cylinder 16 respectively via check valves 31 and 32 permitting only flow of brake fluid from the reservoirs 25 and 26 to the master cylinder 16.

The intermediary between the wheel cylinder 5 and the control valve 21 is connected to the master cylinder 16 by a line to which a check valve 17 permitting only flow of brake fluid from the wheel cylinder 5 to the master cylinder 16 is arranged. Similarly, lines connecting the master cylinder 16 are provided to the other wheel cylinders 6–8 and check valves 18–20 are respectively connected to the lines.

The above-mentioned master pressure cut-off valves 11 and 12, the control valves 21–24 and the reservoir control valves 13 and 14 are valves having two ports and two positions in each of which the needle switches ports by moving responsive to a solenoid when power is supplied thereto based on a signal from an electronic control device 40 (ECU). Incidentally, the ports are at designated locations when the respective valves are not operated so that anti-skid control is not started. Other than the electromagnetic valve, a mechanical valve may be adopted for each valve.

ECU 40 is constituted by a microprocessor including a CPU, ROM, RAM, I/O interface, etc. ECU 40 is supplied with power by switching on an ignition switch 41, receives signals from the wheel speed sensors 27–30, performs calculations, control and the like for controlling braking forces such as calculation of wheel speed or vehicle speed, calculation or prediction of slip state of the respective wheels 1–4, etc., and outputs drive control signals to the master pressure cut-off valves 11 and 12, the control valves 21–24 and the reservoir control valves 13 and 14.

Figure 2:
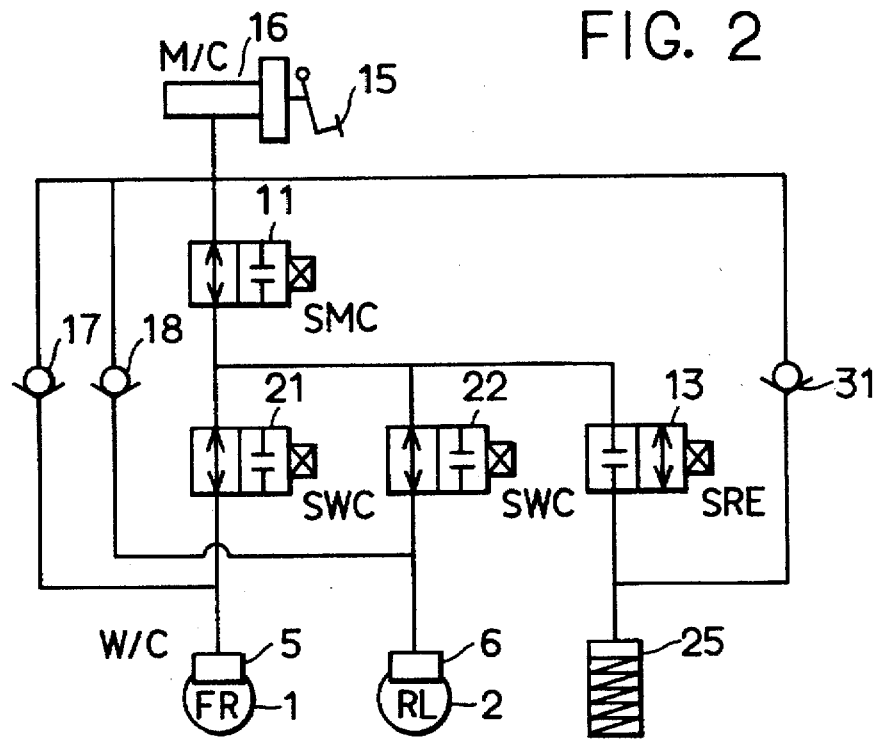
FIG. 2 is a hydraulic pressure circuit diagram showing a hydraulic circuit for two wheel cylinders as a simplified model in the first embodiment.

FIG. 2 is a simplified model diagram of the brake piping system of FIG. 1 with regard to the right front wheel 1 and the left rear wheel 2 in the brake piping system constituted as in FIG. 1. An explanation will be given of a method of controlling the respective valves 11, 21, 22 and 13 by ECU 40 using the brake piping system as follows.

TABLE I shows the operation of the respective valves 11, 21, 22 and 13 corresponding to respective control modes (pressure increasing, maintaining and decreasing) with regard to the wheel cylinder 5 for the right front wheel 1 and the wheel cylinder 6 for the left rear wheel 2 during anti-skid control. In TABLE I, the wheel cylinder is abbreviated as W/C, the master pressure cut-off valve is abbreviated as SMC, the control valve is abbreviated as SWC and the control valve for reservoir is abbreviated as SRE.

TABLE I

| Mode | W/C 5 | W/C 6 | SMC 11 | SWC 21 | SWC 22 | SRE 13 |
|------|-------|-------|--------|--------|--------|--------|
| A | Increase | Increase | O | O | O | X |
| B | Increase | Maintain | O | O | X | X |
| C * | Increase | Decrease | X | X | O | O |
| D | Maintain | Increase | O | X | O | X |
| E | Maintain | Maintain | O | X | X | X |
| F | Maintain | Decrease | X | X | O | O |
| G * | Decrease | Increase | X | O | X | O |
| H | Decrease | Maintain | X | O | X | O |
| I | Decrease | Decrease | X | O | O | O |
| J | Comm. Out. (Hi Side + Lo Side −) | | X | O | O | X |

(O = Open valve, X = Closed valve)

A total of nine kinds of combinations are conceivable in the respective cases where three kinds of control corresponding to pressure increasing, pressure maintaining and pressure decreasing are required for the wheel cylinder 5 and three kinds of control corresponding to pressure increasing, pressure maintaining and pressure decreasing are required for the wheel cylinder 6. However, in the present embodiment, in a combination where one of the outputs is pressure increasing and the other one thereof is pressure decreasing, priority is given to realizing pressure decreasing and as a result, the other operation is implemented as pressure maintaining even if pressure increasing is requested.

Mode A

When the wheel cylinder 5 (W/C 5) is under a pressure increasing operation and the wheel cylinder 6 (W/C 6) is also under a pressure increasing operation, the master pressure cut-off valve (SMC 11) and the control valves (SWC 21, SWC 22) are brought into a communicating state and the reservoir control valve (SRE 13) is brought into a blocking state. Therefore, the pressures of the both wheel cylinders 5 and 6 are increased by the master cylinder pressure.

Mode B

When the wheel cylinder 5 is under a pressure increasing operation and the wheel cylinder 6 is under a pressure maintaining, the control valve SWC 22 is brought into a blocking state and the other valves assume the same states as in Mode A.

Mode C

When the wheel cylinder 5 is under a pressure increasing operation and the wheel cylinder 6 is under a pressure decreasing operation, priority is given to the pressure decreasing operation of the wheel cylinder 6 as mentioned above and therefore, actually the pressure of the wheel cylinder 5 is maintained. That is, the master cylinder cut-off valve SMC 11 and the control valve SWC 21 are brought into a blocking state and the control valve SWC 22 and the reservoir control valve SRE 13 are brought into a communicating state. Therefore, the pressure decreasing is achieved by letting brake fluid in the wheel cylinder 6 flow into the reservoir 25.

Mode D

When the wheel cylinder 5 is under a pressure maintaining operation and the wheel cylinder 6 is under a pressure increasing operation, the master pressure cut-off valve 11 and the control valve SWC 22 are brought into a communicating state and the control valve SWC 21 and the reservoir control valve SRE 13 are brought into a blocking state.

Therefore, only the pressure of the wheel cylinder 6 is increased by the pressure from master cylinder 15.

Mode E

When both of the wheel cylinders 5 and 6 are under a pressure maintaining operation, the control valve SWC 22 is also brought into a blocking state relative to the case of Mode D.

Mode F

When the wheel cylinder 5 is under a pressure maintaining operation and the wheel 6 is under a pressure decreasing operation, the master pressure cut-off valve SMC 11 and the control valve SWC 21 are brought into a blocking state and the control valve SWC 22 and the valve for reservoir SRE 13 are brought into a communicating state. Therefore, the pressure decreasing is achieved by letting the brake fluid in the wheel cylinder 6 flow into the reservoir 25. This is actually the same valve configuration as in Mode C.

Mode G

When the wheel cylinder 5 is under a pressure decreasing operation and the wheel cylinder 6 is under a pressure increasing operation, priority is given to the pressure decreasing operation of the wheel cylinder 5 as mentioned above and accordingly, actually the pressure of the wheel cylinder 6 is maintained. That is, the master pressure cut-off valve SMC 11 and the control valve SWC 22 are brought into a blocking state and the control valve SWC 21 and the control valve for reservoir SRE 13 are brought into a communicating state. Therefore, the pressure decreasing is achieved by letting the brake fluid in the wheel cylinder 5 flow into the reservoir 25.

Mode H

When the wheel cylinder 5 is under pressure decreasing and the wheel cylinder 6 is under pressure maintaining, the situation is the same as in Mode G.

Mode I

When both of the wheel cylinders 5 and 6 are under a pressure decreasing operation, only the master pressure cut-off valve SMC 11 is brought into a blocking state and the control valves SWC 21 and SWC 22 and the reservoir control valve SRE 13 are brought into a blocking state. Therefore, the pressure decreasing is achieved by letting the brake fluid in the wheel cylinders 5 and 6 flow into the reservoir 25.

As explained above, when decreasing pressure, the brake fluid in the wheel cylinder 5 or 6 flows into the reservoir 25 as in Modes C and F–I. Other than the above cases, there is "communication output" that is produced by shifting the brake fluid between the wheel cylinders 5 and 6 that is a characteristic of the present invention. The generation of this communication output is performed when the pressure of the wheel cylinder on high pressure side is decreased and the pressure of the wheel cylinder on the low pressure side is increased in which the master pressure cut-off valve SMC 11 and the reservoir control valve SRE 13 are brought into a blocking state and the control valves SWC 21 and SWC 22 are brought into a communicating state. Therefore, the pressure of the wheel cylinder on the high pressure side is decreased and the pressure of the wheel cylinder on the low pressure side is increased by movement of the brake fluid only between the wheel cylinders 5 and 6 by passing through the control valves SWC 21 and SWC 22.

Next, an explanation will be given of a specific anti-skid control by ECU 40 in this embodiment based on a flowchart. Incidentally, the explanation will be given based on the control with regard to two wheels and two wheel cylinders as shown in FIG. 2 to facilitate the explanation.

Figure 3:
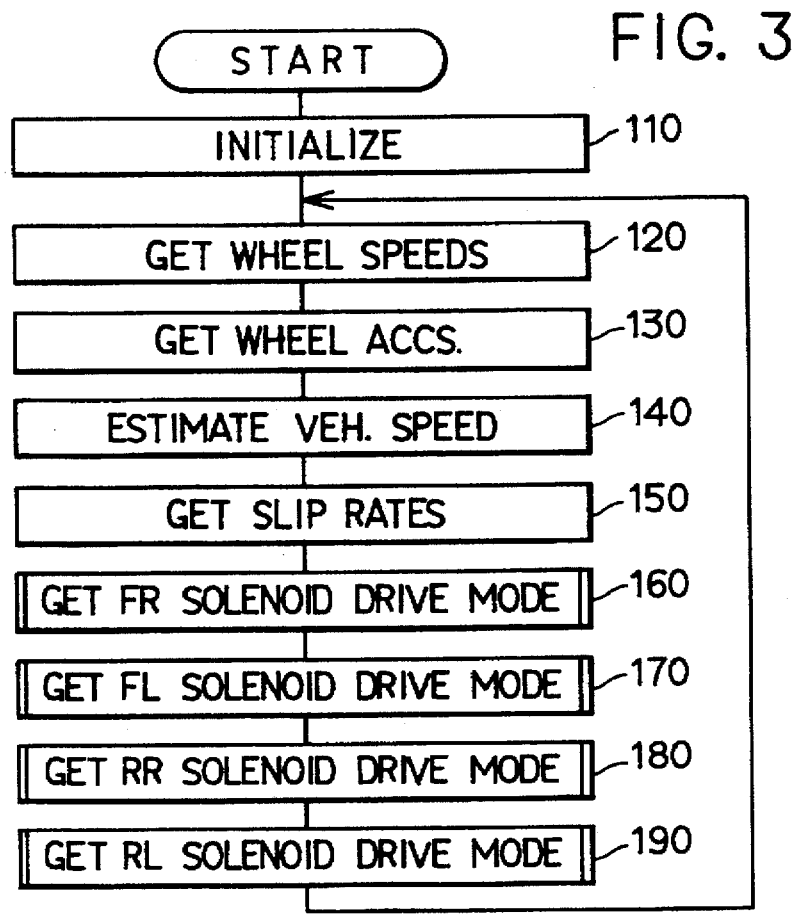
FIG. 3 is a flowchart showing the main processing in anti-skid control in the first embodiment.

FIG. 3 is a flowchart of the main processing showing the total constitution of an anti-skid control system according to the first embodiment. The processing is started when the ignition switch 41 is switched on.

When the processing is started, firstly initialization is performed for initial setting of various flags and various counters (Step 110). Successively, wheel speeds Vw of respective wheels are calculated based on wheel speed signals from the wheel speed sensors 27–30 provided to the respective wheels 1–4 in Step 120. In Step 130, wheel accelerations dVw of the respective wheels are calculated.

In Step 140 a vehicle speed VB is predicted based on the wheel speeds Vw, and in Step 150 slip rates Sw of the respective wheels are calculated based on the wheel speeds Vw, the vehicle speed VB, etc. A detailed explanation of this process will be omitted since the method of calculation is well-known.

In Step 160, a solenoid drive control mode of the right front wheel is determined. Similarly, in Steps 170 through 190, the solenoid drive control modes for the left front wheel, the right rear wheel and the left rear wheel are determined.

Next, an explanation will be given of a routine for determining the solenoid drive control mode that is common to the control processings in Steps 160 through 190 in the main routine of FIG. 3 in accordance with a flowchart shown in FIG. 4.

In the first Step 310 of the control mode determining processing, whether the anti-skid control has already been started and whether in-control mode is set or off-control mode is set is determined. Here, if it is determined that in-control mode is set, the operation proceeds to Step 350 and if it is determined that the operation is not controlled by the in-control mode, the operation proceeds to Step 320.

In Step 320, whether the wheel slip rate Sw is larger than a predetermined value KS is determined. When it is determined that the slip rate Sw is larger than the predetermined value KS, the operation proceeds to Step 330 after determining that the wheel has a tendency to lock up, and the processing sets a flag designating in-control mode. When it is determined that the wheel slip rate Sw is equal to or less than the predetermined value KS in Step 320, the operation proceeds to Step 340 after determining that the slip state of the wheel is in a comparatively fair condition and resets the in-control mode. After resetting the in-control mode, this pass through the main routine is finished.

In Step 350 to which the operation proceeds from Step 310 or 330, whether the slip state of the wheel is more than a predetermined amount is determined. That is, the slip rate Sw is compared with the predetermined value KS. When it is determined that the slip rate Sw is equal to or less than the predetermined vale KS here, the operation proceeds to Step 390 (described later) and when it is determined that the slip rate Sw is larger than the predetermined value KS, the operation proceeds to Step 360.

Proceeding to Step 360 signifies that the slip state is equal to or larger than a predetermined amount and in Step 360 whether the wheel acceleration dVw is smaller than 0 is determined. That is, whether the wheel speed VB is decelerating or in the direction of recovering is determined. Here, in a state where the wheel acceleration dVw is smaller than 0, that is, the slip state of the wheel is equal to or more than the predetermined amount and the wheel speed Vw is decelerating, a pressure which is equal to or more than a pertinent brake pressure may be applied on the wheel cylinder and the slip state may further be deteriorated and accordingly, the operation proceeds to Step 370 and selects the pressure decreasing mode.

Further, if in Step 360 the wheel acceleration dVw is more than 0, that is, the wheel speed is in the direction of recovering and an approximately pertinent brake pressure is currently applied on the wheel cylinder and accordingly, the operation proceeds to Step 380 where the pressure maintaining mode is set.

Meanwhile, when it is determined in Step 350 that the slip rate Sw is equal to or less than the predetermined value KS, the operation proceeds to Step 390. Here, the proceeding to Step 390 signifies that the slip rate of wheels is a predetermined amount or less and the brake pressure to be applied to the wheel cylinders is deficient and a determination with respect to a control mode increasing the wheel cylinder pressure is conducted. That is, in Step 390, whether execution in a predetermined period of time has been finished in slow pressure increasing mode is determined. When it is determined that the execution is not finished, the operation proceeds to Step 400 where the slow pressure increasing mode is successively set.

When it is determined in Step 390 that the slow pressure increasing mode has been finished, the operation proceeds to Step 340 where in-control mode is reset and a follow-up operation is repeatedly executed.

Next, an explanation will be given of the control mode that is set in the above-mentioned processing of FIG. 4. The control mode signifies a method of controlling the brake pressure applied on the wheel cylinders 5 and 6 which is realized by controlling the above-mentioned respective valves 11, 21, 22 and 13 in the midst of the anti-skid control by continuing the application for a predetermined period of time or at every predetermined time interval. An explanation will be given to relationship between the control mode and the content of output in correspondence with the mode.

First, the control mode is grossly classified into the in-control mode showing that the anti-skid control is being executed and the off-control mode showing that the anti-skid control is not executed, that is, a normal braking operation is being performed.

There are three modes of pressure decreasing mode, pressure maintaining mode and slow pressure increasing mode in the in-control mode.

First, the pressure decreasing mode signifies a control selecting pressure decreasing output or communication output that is set by FIG. 7 described below (also refer to TABLE I) which is continuously executed for a predetermined period of time. Further, the pressure maintaining mode signifies control executing the pressure maintaining output continuously for a predetermined period of time.

In the slow pressure increasing mode, the content of output differs by front wheels or rear wheels. With respect to the front wheel, the control is executed by repeating at predetermined times and at a predetermined period of time the pressure increasing output and the pressure maintaining output. The increase of the wheel pressure only by the pressure increasing output tends to be too rapid and therefore, the slip state of the wheel may be deteriorated at once. Accordingly, the pressure increasing and the pressure maintaining are repeated as in the slow pressure increasing mode. On the other hand, with respect to the rear wheel, the pressure maintaining output or the communication output in accordance with the control on the front wheel is conducted pertinently.

Further, in the case of the off-control mode, the control is performed by continuously executing the pressure increasing output. That is, when the in-control mode is reset as in Step 340 of FIG. 4, the off-control mode is automatically performed.

Figure 5:
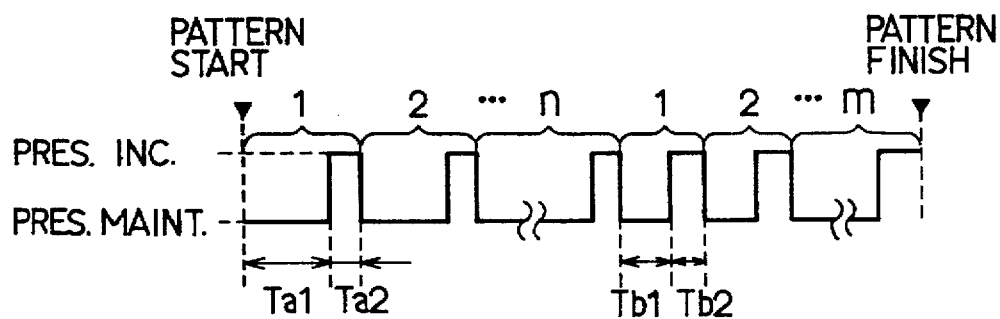
FIG. 5 is an explanatory view showing a corresponding relationship between control mode and content of output in the first embodiment.

This behavior is graphically illustrated in FIG. 5.

Figure 6:
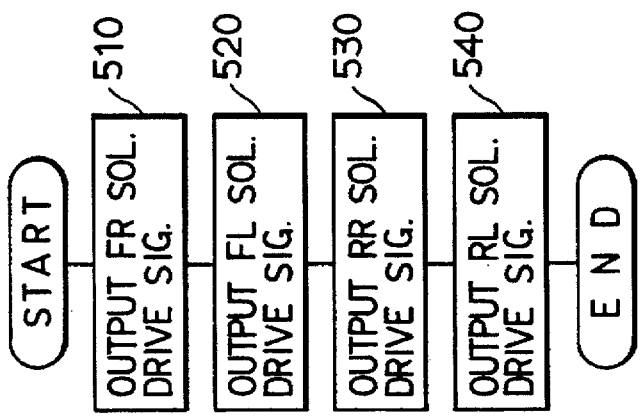
FIG. 6 is a flowchart showing solenoid drive output control processing in the first embodiment.
Figure 8A:
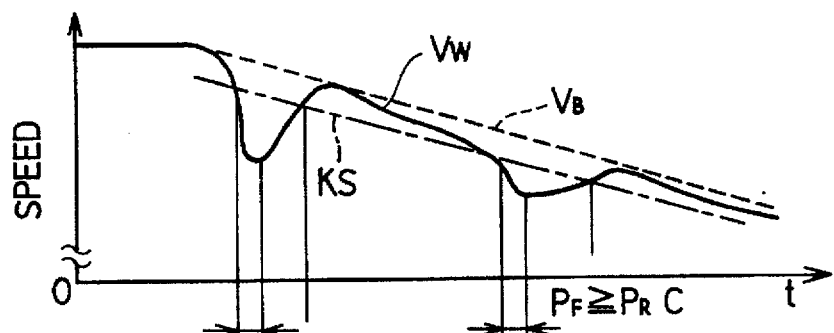
FIGS. 8A-8E illustrate time charts showing wheel cylinder pressure, change of liquid amount in a reservoir, etc., when anti-skid control in the first embodiment is carried out where communication output is operated a predetermined number of times after decreasing rear wheel pressure.
Figure 8B:
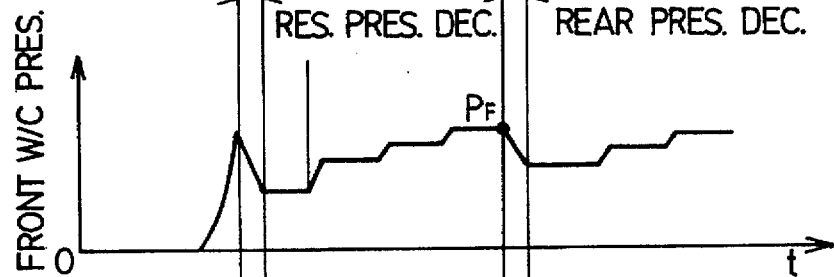
Figure 8C:
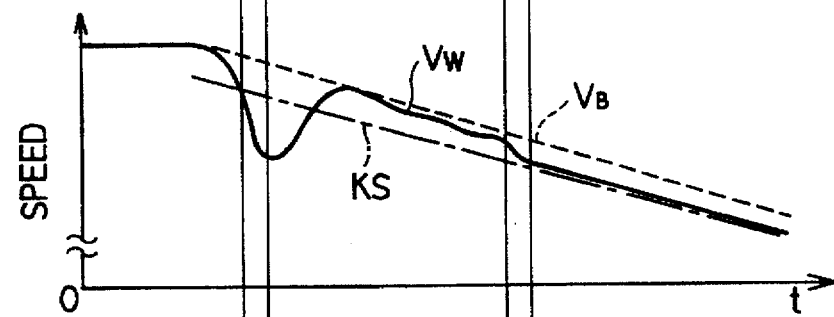
Figure 8D:
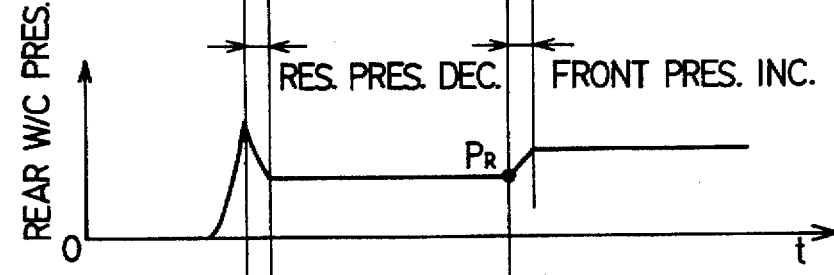
Figure 8E:
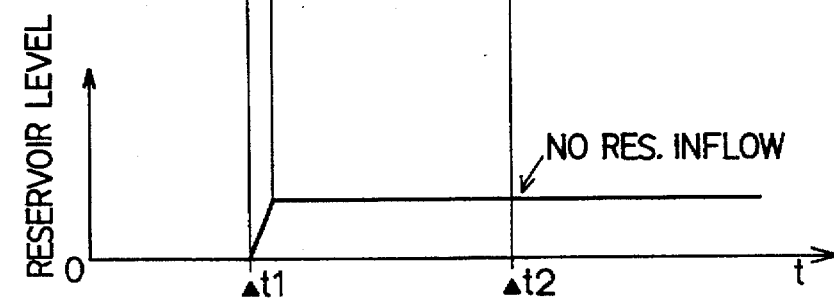

Next, FIG. 6 shows a flowchart for outputting control signals to actuators to drive by solenoid the respective actuators (control valves 21–24) corresponding to the respective wheels 1–4, more in detail the respective wheel cylinders 5–8 in response to the main routine of FIG. 3.

The processing of FIG. 6 is executed by timer interruption every millisecond. In Step 510, a drive signal is outputted to drive the control valve 21 corresponding to the right front wheel based on the solenoid drive control mode that is determined in Step 160 of FIG. 3. Similarly, drive signals are outputted to drive the control valves 22–24 corresponding to the left front wheel, the right rear wheel and the left rear wheel based on the solenoid drive control modes that are determined in Steps 170–190 of FIG. 3 (Steps 520–540).

Figure 7:
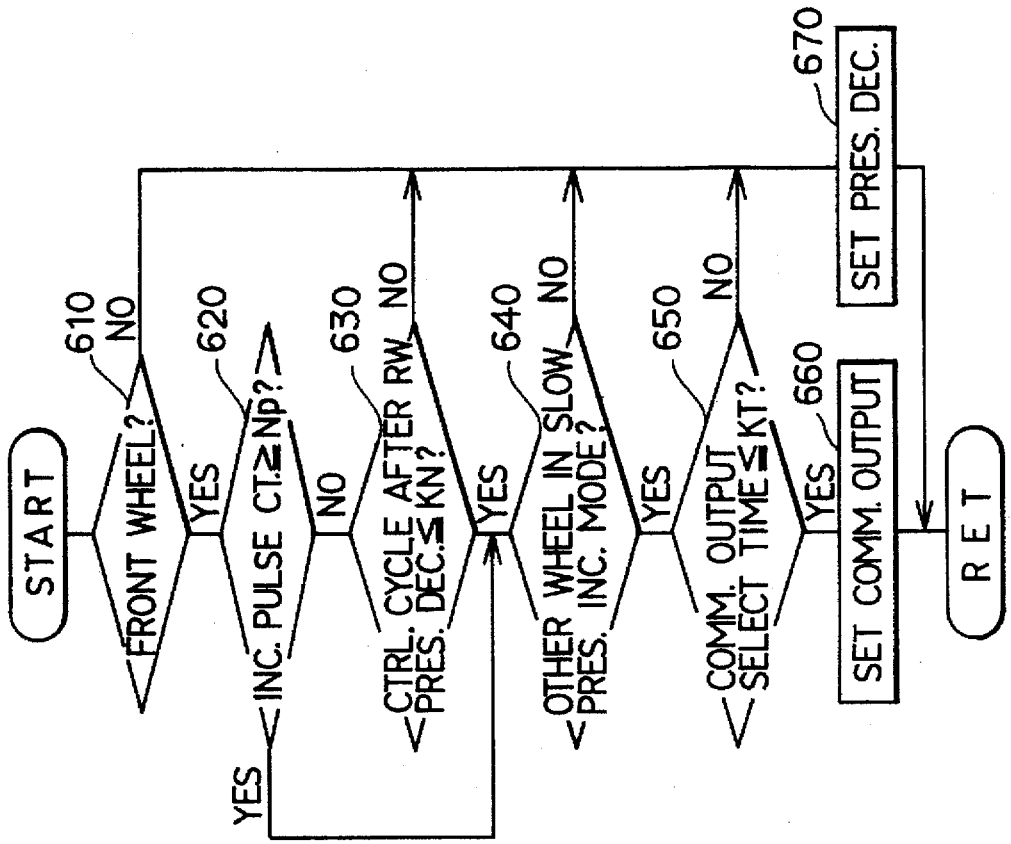
FIG. 7 is a flowchart showing control processing in a pressure decreasing mode in the solenoid drive output control processing in the first embodiment.

This is the processing concerning general solenoid drive output, and if the determined control mode is the pressure decreasing mode, the processing as shown in the flowchart of FIG. 7 is executed further, and the pressure decreasing output or the communication output is selected and outputted. As mentioned above, in the pressure decreasing output, the brake fluid in the wheel cylinders 5 and 6 flows into the reservoir 25, and in the communication output, the wheel cylinders 5 and 6 are communicated. The communication output is selected only in the case where predetermined conditions are established.

In this embodiment there are two cases, generally speaking, in selecting the communication output. In one of the cases the communication output is performed a predetermined number of times (KN) after the pressure decreasing output is conducted with respect to the rear wheel, and in the other thereof a road for running a vehicle is shifted from road having a predetermined low coefficient of friction μ to a road having a high predetermined coefficient of friction. An explanation will be given of the reason that the communication output is conducted for these two cases; in other words, the communication output may be executed.

(1) Execution a predetermined number of times (KN) after pressure decreasing of rear wheel cylinder In this case, when the pressure decreasing output is conducted for the rear wheel, the wheel cylinder pressure is lower than a hydraulic pressure corresponding to a road μ peak and therefore, the wheel pressure can be increased up to the hydraulic pressure corresponding to the road μ peak; also, the wheel cylinder pressure becomes comparatively low and accordingly, it is determined that the control of making the wheel cylinders 5 and 6 communicate can be carried out. That is, 1) the pressure of the wheel cylinder 5 at the front wheel can be decreased by the communication output since the pressure of the wheel cylinder 5 at the front cylinder is larger than the pressure of the wheel cylinder 6 at the rear wheel and 2) the pressure of the wheel cylinder 6 at the rear wheel is smaller than the hydraulic pressure corresponding to the road μ peak are compatible with each other. Therefore, there is no problem in carrying out the communication output. However, when the communication control of the wheel cylinders 5 and 6 is conducted, the difference between the two wheel cylinder pressures is diminished and the wheel cylinder pressure at the rear wheel becomes proximate to the hydraulic pressure corresponding to the road μ peak and therefore, a safeguard of the predetermined number of times KN is set.

(2) Execution in shifting from low μ road to high μ road

The wheel cylinder pressure where the rear wheel is considerably deficient with respect to the hydraulic pressure corresponding to road μ peak when the road μ is changed from low to high and therefore, it can be increased up to the hydraulic pressure corresponding to the road μ peak and this is precisely a situation optimal for conducting the communication output control. Namely, the pressure of the wheel cylinder 6 at the rear wheel is smaller than the hydraulic pressure corresponding to the road μ peak and therefore, the pressure of the wheel cylinder 6 at the rear wheel can be increased. In addition, in this case the degree of deceleration is enhanced by increasing the pressure of the wheel cylinder 6 for the rear wheel. Therefore, the pressure of the wheel cylinder 6 at the rear wheel can be increased with high response performance in compliance with the road shifting by utilizing the pressure of the wheel cylinder 5 at the front wheel that is higher than the pressure of the wheel cylinder 6 at the rear wheel. In this case, in the communication control, the amount of the brake fluid per se in a piping between the wheel cylinders 5 and 6 for the front wheel and the rear wheel does not diminish and therefore, the total braking force for the front wheel and the rear wheel is maintained. However, the pressure of the wheel cylinder 5 on the front wheel side that is increased earlier by shifting to the high μ road is distributed to the rear wheel side with excellent response performance, by which an ideal braking force distribution can be approximated more quickly, the vehicle braking force can be increased as a total and the degree of deceleration can be enhanced. Also, the behavior of the vehicle can be stabilized by the quick approximation to the ideal braking force distribution.

Next, an explanation will be given of the processing of FIG. 7.

First, whether the current operation of flow is with respect to the front wheel is determined in Step 610. In the case of the front wheel, the operation proceeds to Step 620 and in the case of the rear wheel, the operation proceeds to Step 670. In Step 670 the pressure decreasing output is set and one pass of the processing is finished.

In Step 620, whether the number of pulses of the pressure increase in the previous control cycle is the predetermined number of pulses Np or more is determined, the operation proceeds to Step 640 if the number of pulses of the pressure increase is the predetermined number of pulses Np or more and otherwise, the operation proceeds to Step 630.

The determination of whether the number of pulses of the pressure increase is the predetermined number of pulses Np or more in Step 620 is performed to determine whether the road is shifted from the low μ road to the high μ road which has been explained in the above-mentioned item (2). An explanation will be given thereof.

The control is adjusted on a predetermined uniform μ road such that the pressure increasing control is realized at less than the predetermined number of pulses of the pressure increase (for example, pulse number=4) and thereafter the control is shifted to the pressure decreasing mode and the above-mentioned predetermined number of pulses is determined as Np=6. Therefore, in the case of running on the uniform μ road, the number of pulses of the pressure increase is always less than the predetermined number of pulses Np, and when the number of pulses of the pressure increase becomes the predetermined number of pulses Np or more, it can be determined that it is because the road is shifted from the low μ road to the high μ road.

Meanwhile, in Step 630 whether the control cycle after the pressure decreasing output with respect to the rear wheel is the predetermined number of times KN or less is determined, and if it is the predetermined number of times KN or less, the operation proceeds to Step 640 and otherwise, the operation proceeds to 670. The significance of the predetermined number of times KN has been explained in the above-mentioned item (1) and, for example, KN=2.

Although two cases where determination has been performed positively in Step 620 or Step 630 become candidates for setting the communication output in Step 660, two conditions are further imposed in this embodiment. Firstly, in Step 640, whether the wheel cylinder of the rear wheel in the same route (for example, wheel cylinder 6 in case of controlling wheel cylinder 5) is currently in the slow pressure increasing mode is determined. This step is for confirming whether the pressure of the wheel cylinder 6 of the rear wheel may be increased, and if it is in the slow pressure increasing mode, the operation proceeds to Step 650 and otherwise, the operation proceeds to Step 670.

Meanwhile, in Step 650, whether time for selecting the communication output is the predetermined period of time KT or less is determined. In the case where the control state stays in the pressure decreasing mode even if the communication output has been continued for the time period of KT, the pressure of the wheel cylinder of the rear wheel may be too high to sufficiently decrease. Therefore, in that case the pressure decreasing is realized firmly by selecting not the communication output but the pressure decreasing output in which the brake fluid flows into the reservoir 25. Therefore, if the time period of selecting the communication output is the predetermined time period KT or less, the operation proceeds to Step 660 and otherwise, the operation proceeds to Step 670. Incidentally, the predetermined time period KT is, for example, 100 ms.

In this way, the communication output is set in Step 660 only in the case where the condition in Step 620 or Step 630 is satisfied and further the conditions of Steps 640 and 650 are cleared, and otherwise, the pressure decreasing output is set in Step 670. Further, in the case of performing the communication output in Step 660, although the positive determination in Step 640 signifies that the slow pressure increasing mode has been set to the wheel cylinder of the rear wheel, in this case the communication output is selected with priority.

A further explanation will be given with reference to time charts showing change in wheel cylinder pressure, change in amount of liquid in the reservoir 25, etc., when the control is conducted in accordance with the above-explained respective flowcharts. FIGS. 8A–8E illustrate a case where the communication output is performed a predetermined number of times (KN) after the pressure of the wheel cylinder for the rear wheel is decreased, which has been explained in the above-mentioned item (1) and FIGS. 9A–9E illustrate a case where the communication output is performed when the road is shifted from the low μ road to the high μ road, which has been explained in the above-mentioned item (2).

First, an explanation will be given of the communication output a predetermined number of times (KN) after the pressure of the wheel cylinder of the rear wheel is decreased in reference to FIGS. 8A–8E. When the wheel speeds of the front wheel and the rear wheel are respectively below a reference of the slip rate (time t1), the pressure decreasing mode in the anti-skid control is executed in which the normal pressure decreasing output decreasing the pressures of the wheel cylinder 5 of the front wheel and the wheel cylinder 6 of the rear wheel by making the brake fluid flow into the reservoir 25 is firstly carried out. However, when the wheel speed of the front wheel becomes lower than the reference value of the slip rate at the next time (time t2), the brake fluid does not flow into the reservoir 25; rather, the brake fluid flows from the wheel cylinder 5 of the front wheel to the wheel cylinder 6 of the rear wheel by communicating the two wheel cylinders 5 and 6 by conducting the solenoid control as specified in the "communication output" in TABLE I. Thereby, the amount of the liquid in the reservoir does not increase even if the wheel cylinder pressure of the front wheel is decreased since the brake fluid does not flow into the reservoir 25.

Figure 9A:
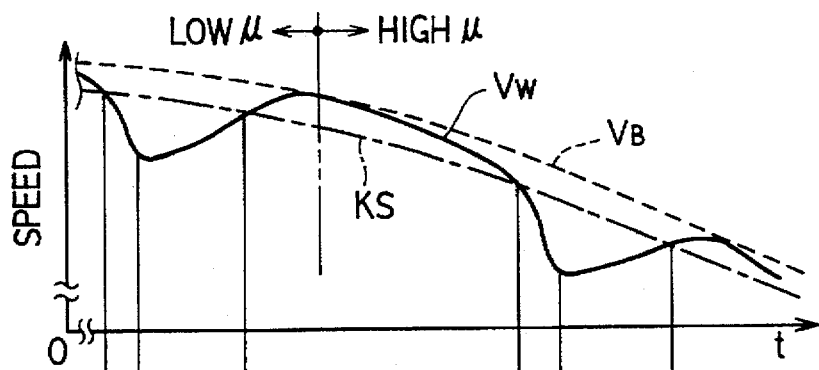
FIGS. 9A-9E illustrate time charts showing wheel cylinder pressure, change in liquid amount in a reservoir, etc., when the anti-skid control in the first embodiment is carried out where a road having a low coefficient of friction is shifted to a road having a high coefficient of friction.
Figure 9B:
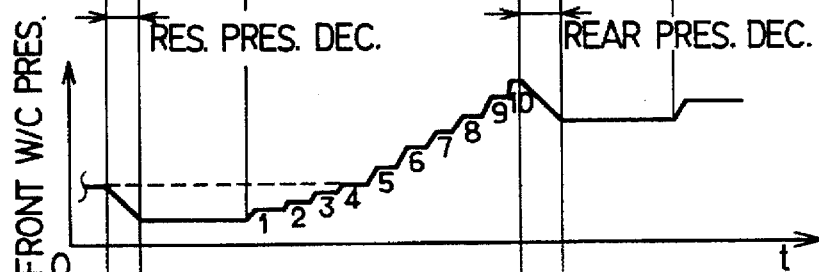
Figure 9C:
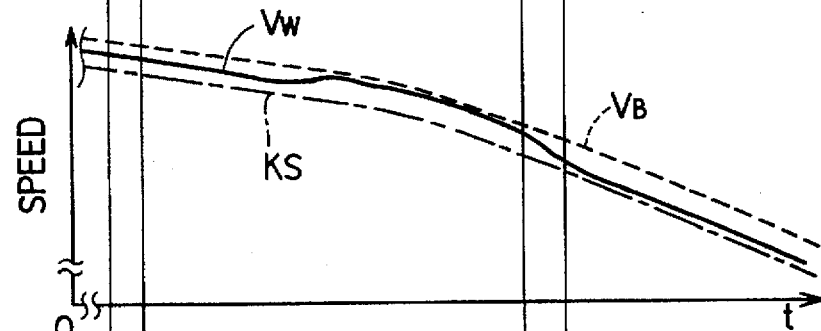
Figure 9D:
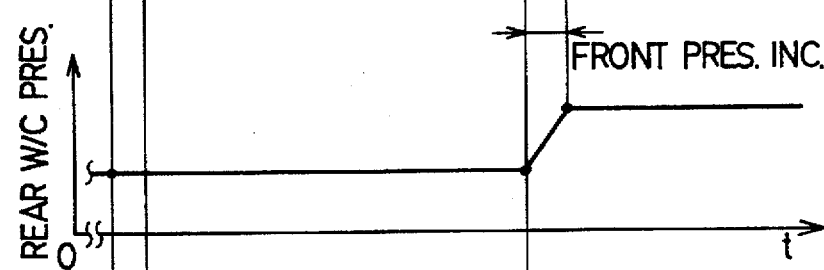
Figure 9E:
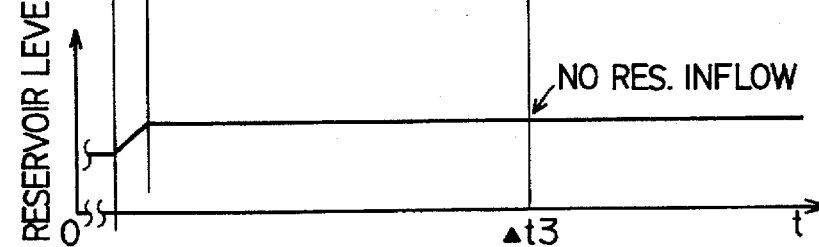

Next, an explanation will be given of the communication output when the road is shifted from a low μ road to a high μ road with reference to FIGS. 9A–9E. The pressure increasing output is conducted to the wheel cylinder 5 of the front wheel when the speed of the front wheel is shifted from a state where it is below the reference value of the slip rate to a state where it exceeds the reference value. The pressure increase is conducted stepwisely in correspondence with pressure increasing pulses and each step is denoted with a numeral successively from 1 as illustrated in FIG. 9B.

As mentioned above, a desired pressure increasing control is realized by four times of stepwise pressure increase in the case of a uniform μ road. However, the road is shifted from the low μ road to the high μ road in the midst of the control and therefore, the hydraulic pressure corresponding to the road μ peak is considerably elevated and the speed of the front wheel becomes lower than the reference value of the slip rate again after the stepwise pressure increasing of the predetermined number of pulses Np=6 or more, or ten times in the case of FIG. 9B (time t3). Therefore, in the pressure decrease in this case, the brake fluid does not flow into the reservoir 25 but from the wheel cylinder 5 of the front wheel to the wheel cylinder 6 of the rear cylinder by communicating the two wheel cylinders 5 and 6 by performing the solenoid control as indicated in the "communication output" in TABLE I. Thereby, the amount of liquid in the reservoir is not increased even if the wheel cylinder pressure of the front wheel is decreased since the brake fluid is not made flow into the reservoir 25.

Further, the diameter of wheel cylinder 5 of the front wheel is larger than the diameter of the wheel cylinder 6 of the rear cylinder. Thereby, a pressing force by which the wheel cylinder 5 of the front wheel presses a pad, not shown, is made larger than a pressing force by which the wheel cylinder 6 of the rear wheel presses the pad (not shown) to carry out the front wheel preceding locking which can achieve a large wheel braking force accompanied by load shift. Under such a constitution, the decreasing brake fluid pressure at the wheel cylinder 5 of the front wheel is larger than the increasing brake fluid pressure at the wheel cylinder 6 of the rear wheel when the communication control is carried out. Therefore, the braking force in view of a total of the vehicle can be enhanced.

As explained above, according to the anti-skid control device of the first embodiment, the control of increasing and decreasing the wheel cylinder pressure is conducted when the slip state of the wheels 1 and 2 is the predetermined amount or more. In this embodiment, there is no pump for drawing the brake fluid from the reservoir 25 and therefore, when the reservoir 25 is full, the brake fluid cannot flow thereinto any more and the pressure decreasing control of the wheel cylinders 5 and 6 cannot be carried out. Therefore, the controllable time of the anti-skid control is shortened. Also, the amount of the brake fluid which can be drawn from the wheel cylinders 5 and 6 is restricted by the storage capacity of the reservoir 25 and therefore, a decisive pressure decreasing control, etc., cannot be conducted; as a result, the degree of freedom of the anti-skid control is diminished.

According to the anti-skid control device of this invention, in the cases of the above-mentioned items (1) and (2), the normal pressure decreasing control is not carried out; rather, the communication output control in which the brake fluid pressure is shifted from the wheel cylinder 5 on the high pressure side to the wheel cylinder 6 on the low pressure side by communicating the wheel cylinders 5 and 6 is executed. In this way, the pressure decrease control can be performed for the wheel cylinder 5 on the high pressure side by only shifting the brake fluid between the wheel cylinders 5 and 6 without making the brake fluid flow into the reservoir 25. Accordingly, the time until the reservoir 25 becomes full is retarded relative to that in the conventional case and the controllable time of the anti-skid control can be prolonged by that amount.

Also, the degree of freedom of control is enhanced. In the conventional case, for example, when the pressure decreasing control of a same number of times is carried out, the amount of the brake fluid which can be drawn from the wheel cylinders 5 and 6 is restricted by the storage capacity of the reservoir and a decisive pressure decreasing cannot be conducted even in the pressure decreasing control for each time. By contrast, in the case of the anti-skid control device of the present intention, for example, if two out of four times of a pressure decreasing control can be conducted by shifting the brake fluid between the wheel cylinders 5 and 6, then, in the remaining two times of pressure decreasing control that is executed by making the brake fluid flow into the reservoir 25, an amount of the brake fluid flowing into the reservoir 25 in the conventional pressure decreasing control of four times can be used, and as a result the degree of freedom of control is enhanced.

The present invention is not restricted to the above-mentioned first embodiment but can be modified in various ways as follows.

Figure 10:
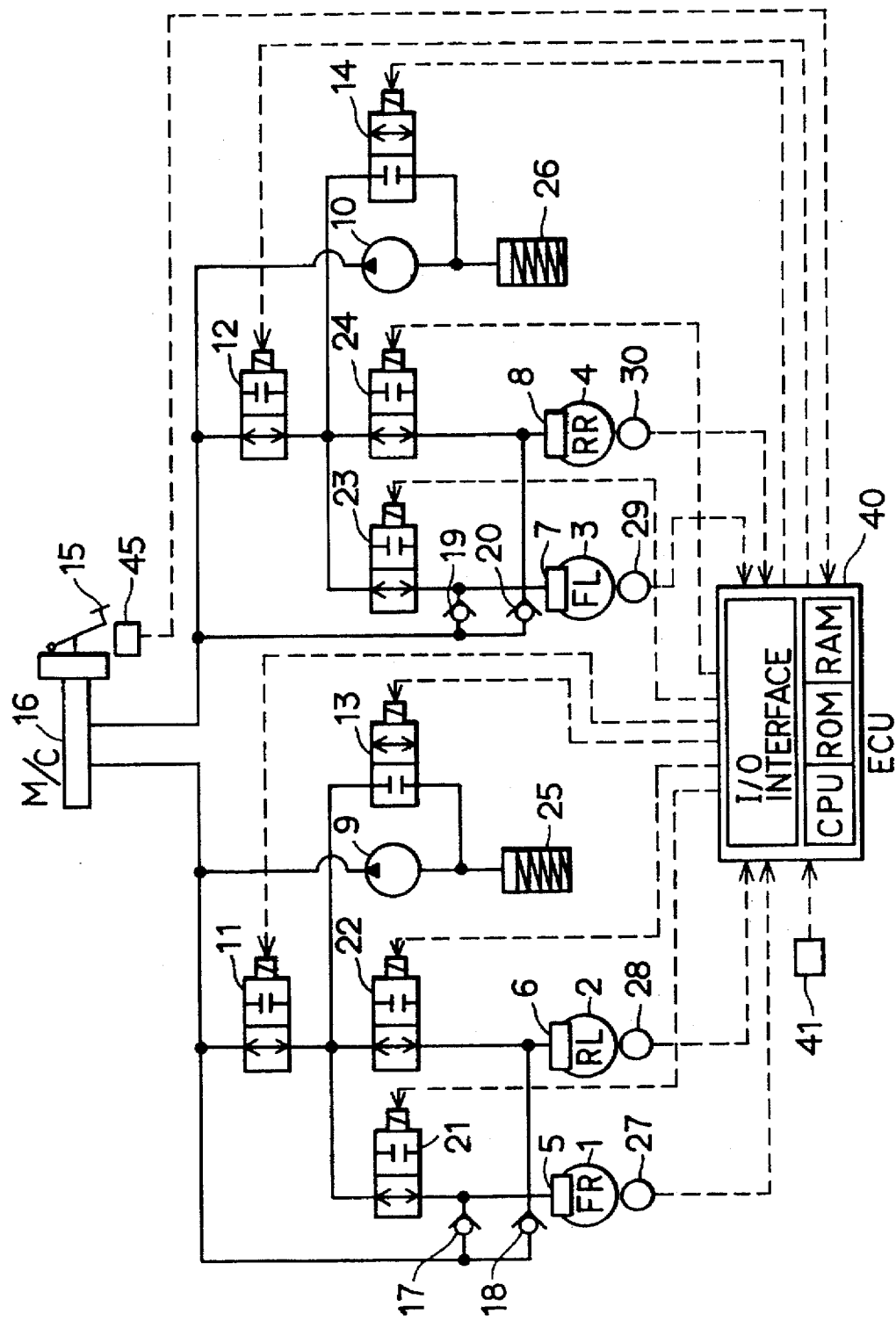
FIG. 10 is an outline explanatory view showing the system constitution of a second embodiment according to the present invention.

For example, in a second embodiment as illustrated in FIG. 10, pumps 9 and 10 are installed in place of the check valves 31 and 32 in the hydraulic circuit of the first embodiment. The pumps 9 and 10 are provided to draw the brake fluid from the reservoirs 25 and 26 and transmit it under pressure to the master cylinder 16. Further, in the second embodiment, mechanisms for detecting pressures of the respective wheel cylinders 5–8 (for example, hydraulic sensors, etc.) are provided and the respective wheel cylinder pressures are inputted to ECU 40. Similarly, the pump 9 is installed in FIG. 11 in place of the check valve 31 in the model diagram of FIG. 2. The following explanation will be given in reference to FIG. 10.

According to the constitution of the second embodiment where the pump for drawing the brake fluid in the reservoir 25 and recirculating it to the master cylinder 16 is added, the pump 9 is driven when performing the anti-skid control, and the pump is stopped when the anti-skid control is not performed. The operation of the respective valves 11, 21 and 22 in correspondence with the respective control modes (pressure increasing, maintaining and decreasing) for the wheel cylinders 5 and 6 in the anti-skid control is the same as those in the explanatory diagram of TABLE I.

Figure 4:
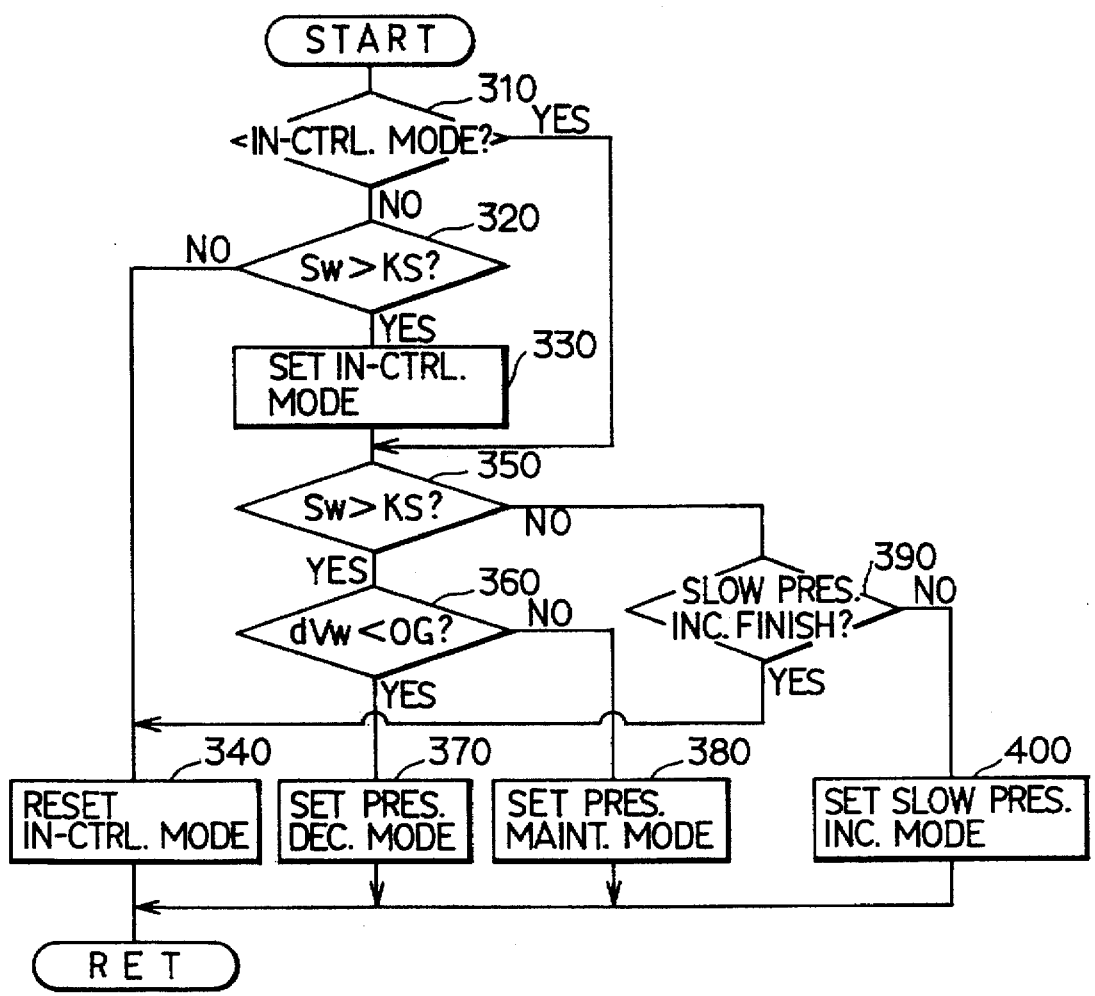
FIG. 4 is a flowchart showing control mode determination processing in the first embodiment.

The basic processing of the anti-skid control is the same as that in the first embodiment as shown by FIGS. 3 and 4, the relationships between control mode and output largely correspond to the relationships between control mode and output illustrated in FIG. 5. An explanation will be given only of portions which are different from those in FIG. 5.

First, in the pressure decreasing mode, the pressure decreasing output or the communication output that is set in FIG. 12, mentioned later, is selected and the control is executed continuously for a predetermined period of time. Although the front wheel and the rear wheel are respectively controlled in the slow pressure increasing mode in the case of FIG. 5, the same output is executed for the front wheel and the rear wheel in this case. That is, the pressure increasing output and the pressure maintaining output are repeated by predetermined times at every predetermined time interval. However, when the communication output is requested for the other wheel in the same route, priority is given to the request.

Figure 12:
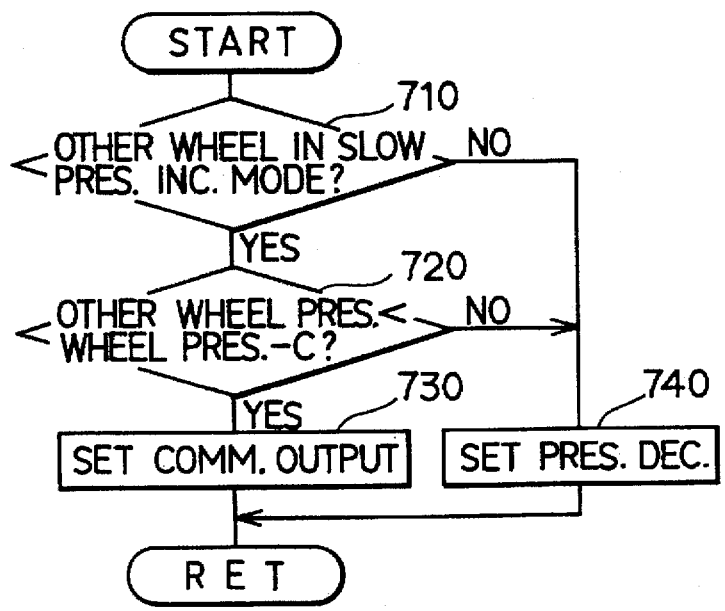
FIG. 12 is a flowchart showing solenoid drive output control processing in the second embodiment where control processing in a pressure decreasing mode is shown.

Next, according to the second embodiment, in the case of the pressure decreasing mode, a processing as illustrated in the flowchart of FIG. 12 is executed in place of the processing of the first embodiment as illustrated in FIG. 7. An explanation will be given of the processing.

First, in Step 710 whether the wheel cylinder of the other wheel in the same route is currently in the slow pressure increasing mode is determined. This step is carried out to confirm that the pressure of wheel cylinder of the other wheel may be increased, and if it is in the slow pressure increasing mode, the operation proceeds to Step 720. Further, a determination is given to whether the wheel cylinder pressure of the other wheel in the same route is lower than the wheel cylinder pressure of the one wheel by a predetermined value C. The pressure decreasing can be performed by making the brake fluid flow to the side of the wheel cylinder of the other wheel if the pressure of the other wheel<the pressure of the one wheel−C. When this condition is established, the operation proceeds to Step 730 where the communication output is set, and if it is not established, the operation proceeds to Step 740 where the pressure decreasing output is set. Incidentally, although the slow pressure increasing mode has been set for the wheel cylinder of the other wheel in this case, the communication output is selected with priority.

In the first embodiment, the pressure increasing, pressure maintaining and pressure decreasing control are performed for the wheel cylinder 5 of the front wheel and the pressure maintaining and pressure decreasing control are performed for the wheel cylinder 6 of the rear wheel and the wheel cylinder pressure of the rear wheel is increased only by the communication output. However, in the second embodiment, the pressure increasing, pressure maintaining and pressure decreasing control are conducted for both of the wheel cylinders 5 and 6 of the front and rear wheels by attaching importance to the degree of deceleration. In the first embodiment, the control is carried out only for the wheel cylinder 5 on the front wheel side in Step 610 of FIG. 7. However, there is no such differentiation in the second embodiment, and the same control is carried out for both of the front and the rear wheel as shown by FIG. 12.

Therefore, although in the first embodiment the pressure of the wheel cylinder 5 of the front wheel may be decreased and the pressure of the wheel cylinder 6 of the rear wheel may be increased in (1) execution with a predetermined number of times (KN) after pressure of the wheel cylinder of the rear wheel has been decreased or (2) execution when the road is shifted from the low μ road to the high μ road, in the case of the second embodiment, the control is based on the respective detected wheel cylinder pressures and the control by the communication output is carried out even in a case where, conversely, the pressure of the wheel cylinder 5 of the front wheel is increased and the pressure of the wheel cylinder 6 of the rear wheel is decreased.

Even if the pump 9 is provided as in the second embodiment, when the capacity of the pump is low and an amount of the brake fluid flowing from the side of the wheel cylinders 5 and 6 is larger than the amount of brake fluid drawn from the reservoir 25, the reservoir 25 still becomes full at an early stage. Therefore, the controllable time of the anti-skid control is shortened and the degree of freedom of control is diminished. Accordingly, even with such a constitution, if the communication output control is performed by shifting the brake fluid between the wheel cylinders 5 and 6 as in the above-mentioned embodiment, a longer controllable time and a larger degree of freedom of control can be realized. Conversely, the capacity of pump 9 may be low by which downsizing of pump or the total of the anti-skid control device and reduction in cost can be achieved.

In this way even in the second embodiment, as in the above-mentioned first embodiment, the decrease in the amount of the brake fluid flowing into the reservoir 25 and the increase in the degree of deceleration of the vehicle can be realized.

Incidentally, the control per se as shown in FIG. 12 of the above-mentioned second embodiment is applicable to a hydraulic circuit having no pumps 9 and 10 as in the first embodiment. That is, it can be realized by adding hydraulic sensors, etc., detecting the pressures of respective wheel cylinders 5–8 to the system of FIG. 1. In that case there is the following advantage. In the first embodiment, the control is executed only in the cases where it is anticipated that there is no problem in the anti-skid control even if the control of shifting the brake fluid between the wheel cylinders 5 and 6 is performed immediately after the pressure decreasing control has been performed or when the road surface is shifted from the low μ road to the high μ road or the like. Therefore, the predetermined number of times KN shown in Step 630 of FIG. 7 is the number of times based on the anticipation and accordingly, a number of times which is too large cannot be set. That is, it must be set to a minimum level. In contrast, when the control is based on the actual difference between the wheel cylinder pressures, if the difference between the wheel cylinder pressures is large, the number of times of control thereafter can be increased. Although the number is restricted to KN=2 in the first embodiment, the number KN can be changed to three or more based on the actual difference between the wheel cylinder pressures.

Figure 11:
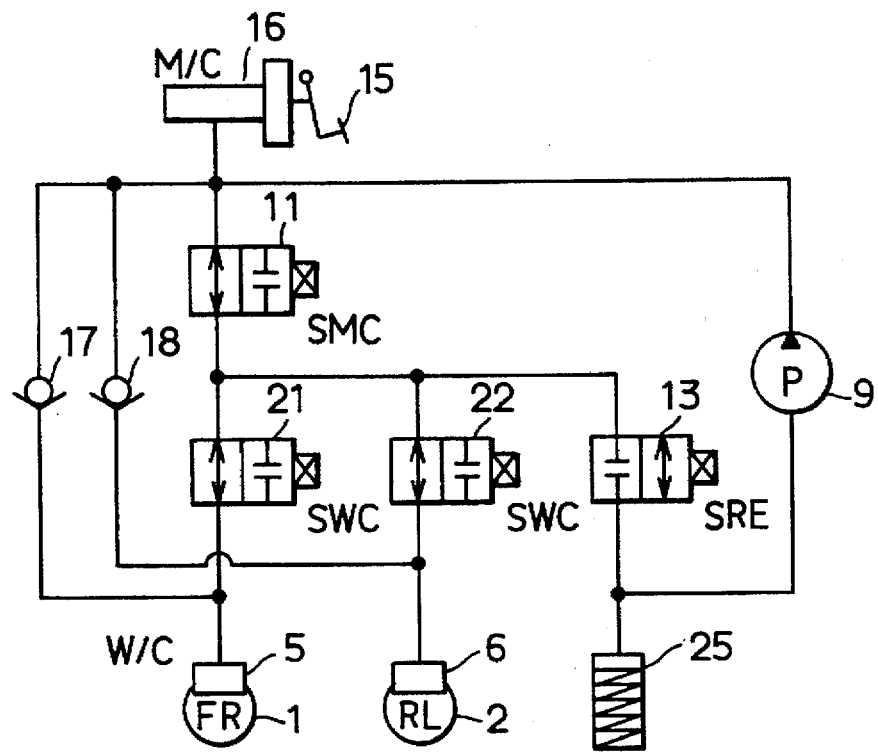
FIG. 11 is a hydraulic circuit diagram showing a hydraulic circuit for two wheel cylinders as a simplified model in the second embodiment.

The brake pressure control of the present invention is applicable to a hydraulic circuit where the arrangement of control valves, etc., is different from those in the above-mentioned first and second embodiments. An explanation will be given of modified examples of hydraulic circuits to which the present invention is applied with reference to FIGS. 13–16. In these, cases the same notations are attached to constituents parts which are the same as those in the first and second embodiments, and a detailed explanation thereof will be omitted for simplicity. Also, model diagrams of brake piping systems for the right front wheel 1 and the left rear wheel 2 corresponding to those of FIGS. 2 and 11 are shown, and hydraulic circuits having the pump 9 will be explained. When the check valve is installed in place of the pump 9, the hydraulic circuit without a pump can naturally be constituted as in the first embodiment.

(First modified example)

Figure 13:
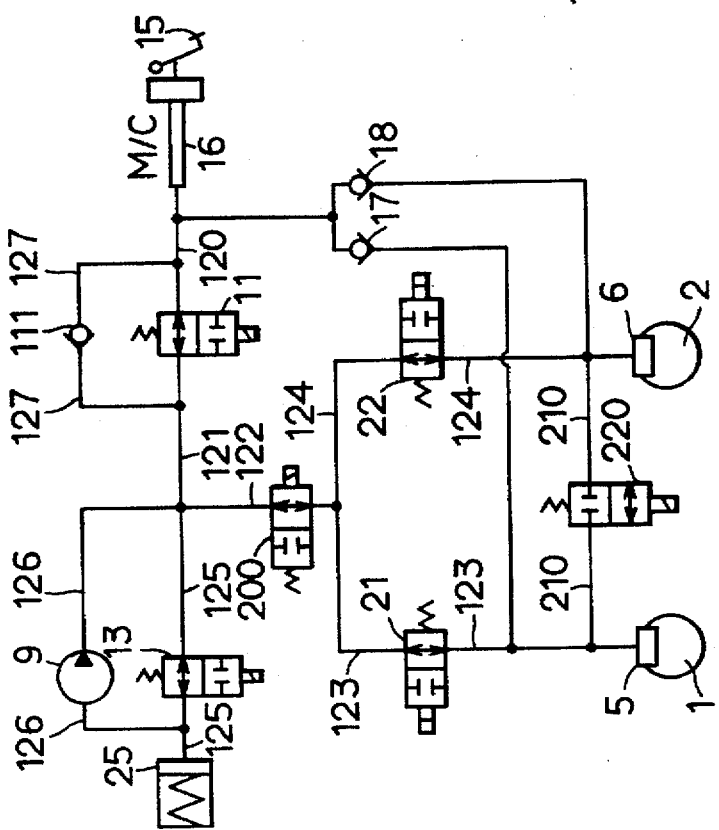
FIG. 13 is a hydraulic pressure circuit diagram showing a first modification of the present invention.

FIG. 13 illustrates a hydraulic circuit according to a first modified example. In the first modified example, an end of a pipeline 120 extending from the outlet port of the master cylinder 16 is connected to the master pressure cut-off valve 11, and a piping extending from the master pressure cut-off valve 11 is connected to the wheel cylinders 5 and 6 via pipelines 121–124. More specifically, an end of the pipeline 122 is branched and the pipelines 123 and 124 constitute a first branch and a second branch, respectively, supplying the brake fluid to the wheel cylinders 5 and 6. In the middle of the pipeline 123 in the first branch there is arranged the control valve 21 which communicates and blocks the brake fluid between the side of the wheel cylinder 5 and the side of the master cylinder 16. Also, in the middle of the pipeline 124 in the second branch there is arranged the control valve 22 which communicates and blocks the brake fluid between the side of the wheel cylinder 6 and the side of the master cylinder 16.

A pipeline 125 connected to the reservoir 25 is connected to the boundary of the pipeline 121 and the pipeline 122. The reservoir control valve 13 is connected to the pipeline 125 to which a pump 9 is connected via a pipeline 126 in parallel with the reservoir control valve 13.

A check valve 111 is connected to the pipeline 120 via a pipeline 127 in parallel with the master pressure cut-off valve 11. The check valve 111 is arranged to permit the brake fluid to flow only from the side of the wheel cylinders 5 and 6 and the side of pump 9 to the side of the master cylinder 16.

Under such a constitution, a control valve for communication output is further added which may be achieved in either of the following two cases, explained below. One is a case where a control valve 200 for communicating and blocking the brake fluid is arranged in the pipeline 122. The other is a case where a communicating path 210 connecting the pipeline 123 between the control valve 21 and the wheel cylinder 5 with the pipeline 124 between the control valve 22 and the wheel cylinder 6 is installed, and a control valve for communicating path 220 capable of communicating and blocking flow of the brake fluid is arranged in the communicating path 155.

In the case of installing the control valve 200, when the control valve 200 is brought into a blocking state and both of the control valves 21 and 22 are brought into a communicating state, the brake fluid is shifted between the wheel cylinders 5 and 6 via the control valves 21 and 22. In this case, the communication output control can be realized regardless of states of the master pressure cut-off valve 11 or the reservoir control valve 13.

On the other hand, in the case of installing the control valve for communicating path 220, when both of the control valves 21 and 22 are brought into a blocking state and the control valve for communicating path 220 is brought into a communicating state, the brake fluid is shifted between the wheel cylinders 5 and 6 via the communicating path 210 and the control valve for communicating path 220. Also in this case, the communication output control can be realized regardless of states of the master pressure cut-off valve 11 and the reservoir control valve 13.

It is difficult in the hydraulic circuit having the control valve 200 or the control valve for communicating path 220 to perform the control of increasing the pressure of one wheel cylinder and decreasing the pressure of the other wheel cylinder other than the communication control. This is because a single pipeline 122 is adopted in both cases of increasing the wheel cylinder pressure by the pump 9 and decreasing the wheel cylinder pressure by making the brake fluid flow into the reservoir 25. While the hydraulic circuit can be simplified thereby, there is a disadvantage in which the simultaneous pressure increasing and decreasing cannot be performed as mentioned above. However, the disadvantage can be resolved if the communication control that is the characteristic of the present invention is adopted. Furthermore, the pressure increasing of the wheel cylinder which is normally conducted by the pump 9, is executed by drawing the brake fluid from the reservoir 25 at only about several atmospheric pressures and by discharging it. However, the pressure increase can be realized with more excellent response by increasing the pressure of one wheel cylinder by utilizing the pressure of the other wheel cylinder originally having high pressure by the communication control than the pressure increasing by pump requiring the above-mentioned steps.

(Second modified example)

Figure 14:
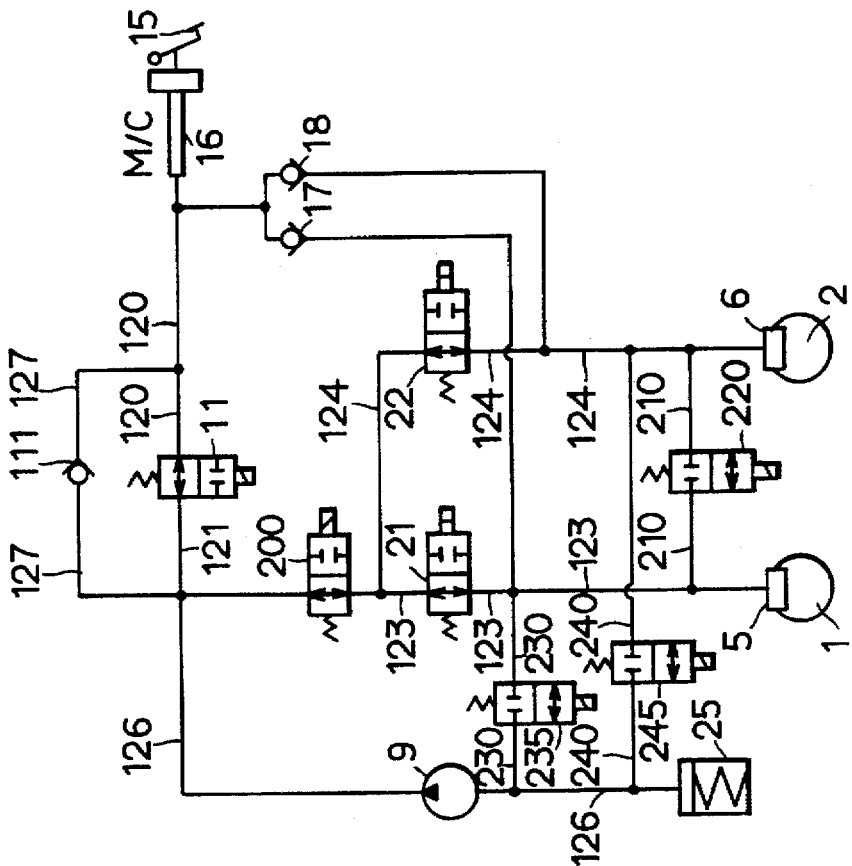
FIG. 14 is a hydraulic pressure circuit diagram showing a second modification of the present invention.

FIG. 14 illustrates a hydraulic circuit of a second modified example. The same notations are attached to constituent parts the same as those in the first modified examples, and explanation thereof will be omitted for simplicity. In the second modified example, the reservoir control valve 13 in the first modified example is replaced by reservoir communicating paths 230 and 240 respectively connecting the pipeline 123 that is provided between the control valve 21 and the wheel cylinder 5 and the pipeline 124 that is provided between the control valve 22 and the wheel cylinder 6 with the pipeline 126 that is provided between the pump 9 and the reservoir 25 and reservoir control valves 235 and 245, respectively, installed in the reservoir communicating paths 230 and 240. As in the first embodiment, there is the case where the control valve 200 is installed in the pipeline 122 and the case where the communicating path connecting the pipeline 123 that is provided between the control valve 21 and the wheel cylinder 5 with the pipeline 124 that is provided between the control valve 22 and the wheel cylinder 6, is provided and the control valve for communicating path 220 is installed in the communicating path 210.

In the case of installing the control valve 200, when the control valve 200 and the reservoir control valves 235 and 245 are brought into a blocking state and both of the control valves 21 and 22 are brought into a communicating state, the brake fluid is shifted between the wheel cylinders 5 and 6 via the control valves 21 and 22.

Meanwhile, in the case of installing the control valve for communicating path 220, when the control valves 21 and 22 and the reservoir control valves 235 and 245 are brought into a blocking state and the control valve for communicating path 220 is brought into a communicating state, the brake fluid is shifted between the wheel cylinders 5 and 6 via the communicating path 210 and the control valve for communicating path 220.

(Third modified example)

Figure 15:
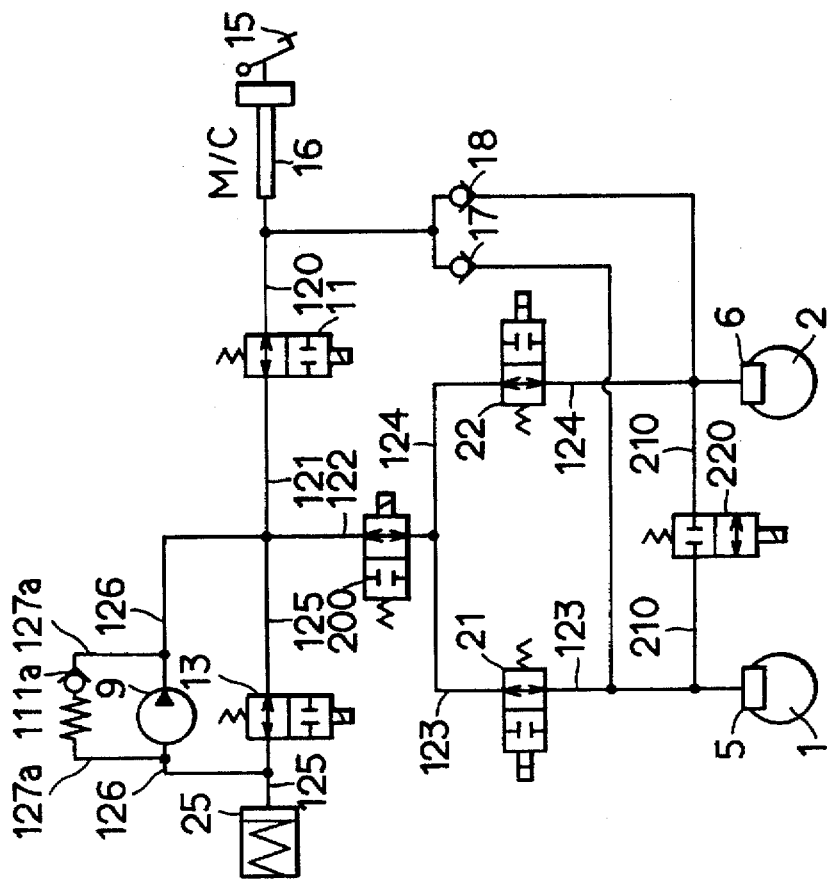
FIG. 15 is a hydraulic circuit diagram showing a third modification of the present invention.

FIG. 15 illustrates a hydraulic circuit of a third modified example. In the third modified example, a pipeline 127a and a relief valve 111a in the pipeline 127a are added to the pipeline 126 in parallel with the pump 9. The same operation and effect are achieved by the relief valve 111a and the pipeline 127a as the check valve 111 and the pipeline 127 in the first modified example. In this case the relief valve 111a is arranged to permit the brake fluid to flow from the discharge side to the suction side of the pump 9. Further, the relief valve 111a permits the brake fluid to flow from the discharge side to the suction side of the pump 9 only when the pressure of the brake fluid becomes a predetermined value at the pipeline on the discharge side of the pump 9. In the case of connecting the pipeline 127a and the relief valve 111a in this way, when all of the master pressure cut-off valve 11, the reservoir control valve for 13 and the control valves 21 and 23 are brought into a blocking state, or when all of the master pressure cut-off valve 11, the reservoir control valve 13 and the control valve 200 are brought into a blocking state, if the pressure of the brake fluid in the respective pipelines is elevated by the brake fluid discharged from the pump 9, the brake fluid can be made flow to the suction side of the pump 9 via the above-mentioned relief valve 111a.

(Fourth modified example)

Figure 16:
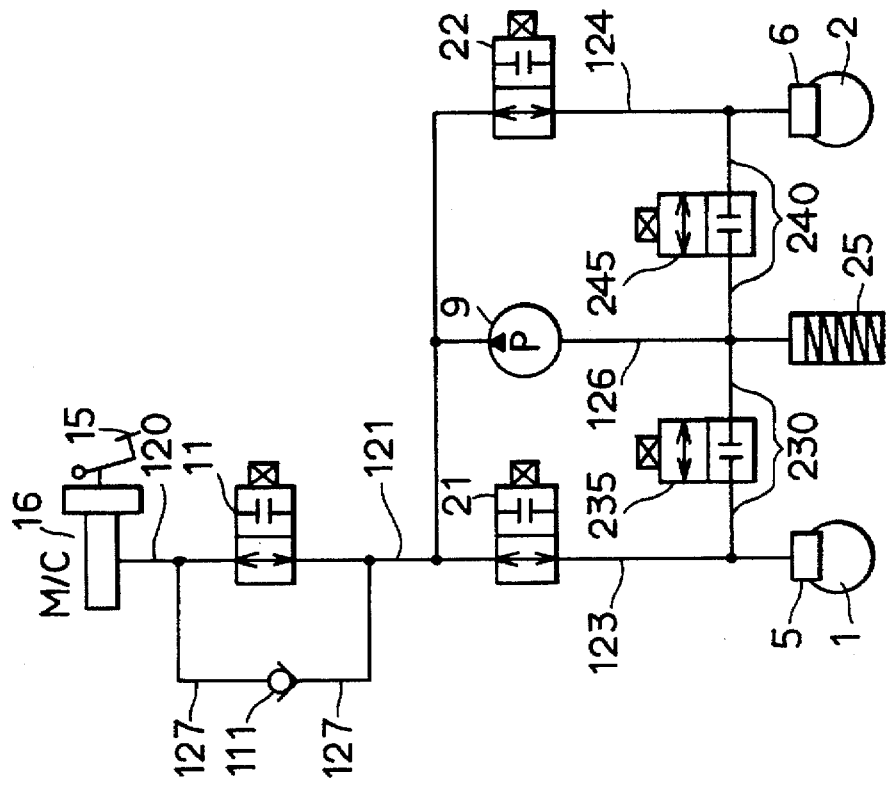
FIG. 16 is a hydraulic circuit diagram showing a fourth modification of the present invention.

FIG. 16 illustrates a hydraulic circuit of a fourth modified example. In the fourth modified example, as in the above-mentioned first modified example, the pipeline 120 extending from the output port of the master cylinder 16 is connected to the master pressure cut-off valve 11 and the pipeline 121 is connected to the downstream side of the master pressure cut-off valve 11. Also, the check valve 111 is connected to the pipeline 120 via the pipeline 127 in parallel with the master pressure cut-off valve 11. The check valve 111 permits the brake fluid to flow only from the side of the wheel cylinders 5 and 6 and the side of the pump 9 to the side of the master cylinder 16.

The pipeline 121 on the downstream side of the master pressure cut-off valve 11 is branched in the middle and connected to the control valves 21 and 22 and the pump 9. As in the above-mentioned second modified example, the control valve 21 is connected to the wheel cylinder 5 via the pipeline 123, the control valve 22 is connected to the wheel cylinder 6 via the pipeline 124 and the pump 9 is connected to the reservoir 125 via the pipeline 126, respectively and the reservoir communicating paths 230 and 240 respectively connecting the pipeline 123 that is provided between the control valve 21 and the wheel cylinder 5 and the pipeline 124 that is provided between the control valve 22 and the wheel cylinder 6 with the pipeline 126 that is provided between the pump 9 and the reservoir 25, are provided. Further, the reservoir control valves 235 and 245 are installed respectively in the reservoir communicating paths 230 and 240.

When communication control is executed in such a device, the master pressure cut-off valve 11 is brought into a blocking state and the control valves 21 and 22 are brought into a communicating state by which the pressure of one of the wheel cylinders originally having high pressure can be decreased and the pressure of the other can be increased via the control valves 21 and 22 in accordance with the shift of the amount of the brake fluid for the amount of the pressure decrease. Also, in this case, the amount of the brake fluid flowing into the reservoir 25 can be restricted and the pressure of the other of the wheel cylinders can be increased with more excellent response than in the pressure increase by the pump 9. Furthermore, if the brake fluid has been stored in the reservoir 25 to some degree in the communication control, the pressure of the other one of the wheel cylinders can be increased simultaneously by the brake fluid that is drawn and discharged by the pump 9, by which the response performance is further improved. The brake fluid discharge by the pump 9 operates on the pressure of the wheel cylinder on the side of the pressure decreasing, and therefore the pressure of the wheel cylinder can be prevented from decreasing to a considerable degree from the viewpoint of a pressure corresponding to the μ peak. Accordingly, the wheel braking force for the wheel corresponding to the wheel cylinder can sufficiently be provided and the wheel braking force for the wheel corresponding to the other wheel cylinder can be increased with excellent response. Therefore, the braking force with respect to a total of a vehicle can be enhanced and the degree of deceleration can be increased.

(Other modified examples)

In the above-mentioned explanation the communicating control is executed, for example, in the case (1) where the number of times of control is within the predetermined number after the pressure of the wheel cylinder of the rear wheel has been decreased, and in the case (2) where the road is shifted from the low μ road to the high μ road. However, the present invention is not restricted thereto and various modifications are possible.

For example, the communication control may be conducted in the case where μ of the road is reversed in a road under the right wheel and a road under a left wheel in a vehicle. That is, it is necessary that the pressure of the wheel cylinder of a wheel originally on the high μ road side is decreased when the road μ becomes low, and the pressure of a wheel cylinder of a wheel originally on the low μ road side is increased when the road μ becomes high. When the communication control is executed in this case, the increasing and decreasing of the wheel cylinder pressure can be realized with good response and the pressure increasing and decreasing control can be realized with no loss of pressure. Further, as explained in the first embodiment, the shifting from low μ to high μ in the reversal of the road μ may be determined by the number of pulses of the pressure increase. In this case, a reference control time for the predetermined uniform μ road may be determined and the determination of the shift from high μ to low μ may be performed based thereon.

Also, in the anti-skid control explained above, the wheel behavior in the combination state of wheel and road is detected simply from the slip rate of wheel and increasing, decreasing and communication control of pressure applied on the respective wheel cylinders 5 and 6 are executed. However, the control of the pressure applied on the respective wheel cylinders 5 and 6 may be executed by, for example, comparing the wheel speeds in contrast to the anti-skid control. That is, in a road for running a vehicle, it is rare that road situation under respective wheels is uniform and road μ often differs under respective wheels. Actually, the speeds of the respective wheels are distributed since an optimum pressure for each wheel is different. Further, the wheel speed reflects the road situation (μ) to some degree and accordingly, when large or small of the speeds of the respective wheels are reversed, for example, for a predetermined time period or more and by a predetermined speed or more in view of the wheel speeds, the communication control may be executed by determining that the road situation under the respective wheels is reversed.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

what is claimed is:

1. A brake pressure controlling apparatus comprising:

a brake pressure generating member generating brake pressure in accordance with a braking operation responsive to a passenger;

a first wheel braking force generating member generating wheel braking force on a first wheel by receiving said brake pressure from said brake pressure generating member;

a second wheel braking force generating member generating said wheel braking force on a second wheel by receiving said brake pressure from said brake pressure generating member;

a piping system communicating said brake pressure generating member with said first and said second wheel braking force generating members;

a pressure increase and decrease controlling means for controlling increase and decrease of said brake pressure applied on at least one of said first and said second wheel braking force generating members;

a prohibiting member provided in said piping system for prohibiting flow of brake fluid from said brake pressure generating member to said first and said second wheel braking force generating members while said pressure increase and decrease controlling means is controlling said brake pressure applied to at least one of said first and said second wheel braking force generating members; and a pressure increasing means for increasing said brake pressure applied on said first wheel braking force generating member by shifting said brake fluid from a side of said second wheel braking force generating member to a side of said first wheel braking force generating member in an intermediary of said piping system from said prohibiting member to said first and said second wheel braking force generating members in a state where said brake pressure applied to said first wheel braking force generating member is lower than said brake pressure applied to said second wheel brake force generating member by a predetermined amount of pressure by operating said pressure increase and decrease controlling means.

2. The brake pressure controlling apparatus according to claim 1, said pressure increase and decrease controlling means comprising:

a control valve for selectively communicating and blocking an intermediary between said first wheel braking force generating member and said second wheel braking force generating member in controlling increase and decrease of said brake pressure applied on said first and said second wheel braking force generating members;

wherein said pressure increasing means is for controlling said control valve of said pressure increase and decrease controlling means from a blocking state to a communicating state in increasing said brake pressure applied on said first wheel braking force generating member by shifting said brake fluid from said second wheel braking force generating member.

3. The brake pressure controlling apparatus according to claim 1, said pressure increase and decrease controlling means comprises:

a first control valve arranged between said prohibiting member and said first wheel braking force generating member in said piping system so that said flow of said brake fluid from said brake pressure generating member to said first wheel braking force generating member is selectively communicated and blocked; and a second control valve arranged between said prohibiting member and said second wheel braking force generating member in said piping system such that said flow of said brake fluid from said brake pressure generating member to said second wheel braking force generating member is selectively communicated and blocked.

4. The brake pressure controlling apparatus according to claim 3, further comprising in said piping system:

communicating paths for communicating said first control valve with said first wheel braking force generating member and said second control valve with said second wheel braking force generating member; and control valves, for said communicating paths, for controlling states of communicating and blocking said flow of said brake fluid in said communicating paths when operating said pressure increasing means.

5. The brake pressure controlling apparatus according to claim 4, wherein when operating said pressure increasing means, said pressure increasing means is for increasing said brake pressure at one of said first and second wheel braking force generating members by shifting said brake fluid having high brake pressure applied on another of said first and second wheel braking force generating members to a side of said one of said first and said second wheel braking force generating members by controlling said control valves for said communicating paths from a blocking state to a communicating state.

6. The brake pressure controlling apparatus according to claim 3, said pressure increasing means being for increasing said brake pressure at one of said first and second wheel braking force generating members by shifting said brake fluid having high brake pressure applied to another of said first and second wheel braking force generating members to a side of said one of said first and said second wheel braking force generating members at an intermediary in said piping system between said first wheel braking force generating member and said second wheel force generating member by controlling both of said first control valve and said second control valve into a communicating state while said prohibiting member prohibits said flow of said brake fluid from said brake fluid generating member to said first and second wheel braking force generating members.

7. The brake pressure controlling apparatus according to claim 3, said pressure increasing means comprising:

determining means for determining whether a pressure difference is present between said brake pressure applied to said first wheel braking force generating member and said brake pressure applied to said second wheel braking force generating member;

wherein said determining means determines whether said pressure difference is present from a state of controlling said first control valve and said second control valve controlled by said pressure increase and decrease controlling means.

8. The brake pressure controlling apparatus according to claim 1, said pressure increase and decrease controlling means comprising:

a reservoir for storing said brake fluid for pressure decrease when said brake pressure applied on at least one of said first and said second wheel braking force generating members is decreased; and a reservoir prohibiting member for prohibiting said flow of said brake fluid from said first and second wheel braking force generating members to said reservoir when operating said pressure increasing means.

9. The brake fluid controlling apparatus according to claim 8, said pressure increase and decrease controlling means comprising a pump for discharging said brake fluid stored in said reservoir to a side of said brake pressure generating member.

10. The brake pressure controlling apparatus according to claim 8, said pressure increase and decrease controlling means comprising a pump for discharging said brake fluid stored in said reservoir to said first and said second wheel braking force generating members.

11. The brake pressure controlling apparatus according to claim 1, wherein said pressure increasing means is operated when said pressure increase and decrease controlling means increases said brake pressure applied on said first wheel braking force generating member and decreases said brake fluid apparatus applied on said second wheel braking force generating member.

12. The brake pressure controlling apparatus according to claim 1, said pressure increasing means being for increasing said brake pressure applied on one of said first and second wheel braking force generating members by utilizing high brake pressure applied on another of said first and second wheel braking force generating members in decreasing said brake pressure at said another one of said first and second wheel braking force generating members when said pressure increase and decrease controlling means has decreased said brake pressure applied on said one of said first and second wheel braking force generating members and later decreases said brake pressure applied on said other one of said first and second wheel braking force generating members.

13. The brake pressure controlling apparatus according to any one of claim 1, said pressure increasing means comprising determining means for determining whether a pressure difference is present between said brake pressure applied on said first wheel braking force generating member and said brake pressure applied on said second wheel braking force generating member.

14. The brake pressure controlling apparatus according to claim 13, said determining means being for determining whether said pressure difference is present from a state of controlling increase and decrease of said brake pressure by said pressure increase and decrease controlling means with respect to said first and second wheel braking force generating members.

15. The brake pressure controlling apparatus according to claim 13, wherein:

said first wheel is constituted by a front side wheel and said second wheel is constituted by a rear side wheel; and said determining means is for determining that said pressure difference is caused when said pressure increase and decrease controlling means decreases said brake pressure applied on said second braking force generating member by not less than a predetermined amount.

16. The brake pressure controlling apparatus according to claim 13, wherein:

said first wheel is constituted by a front side wheel and said second wheel is constituted by a rear side wheel; and said determining means is for determining that said pressure difference is caused when said pressure increase and decrease controlling means increases said brake pressure applied on said first braking force generating member by not less than a predetermined amount.

17. A brake pressure controlling apparatus comprising:

a brake pressure generating member generating brake pressure in accordance with a braking operation by a passenger;

a first wheel braking force generating member generating a wheel braking force on a first wheel by receiving said brake pressure from said brake pressure generating member;

a second wheel braking force generating member generating said wheel braking force on a second wheel by receiving said brake pressure from said brake pressure generating member;

a piping system communicating said brake pressure generating member with said first and said second wheel braking force generating members;

a pressure increase and decrease controlling means controlling increase and decrease of said brake pressure applied on at least one of said first and said second wheel braking force generating members;

a prohibiting member provided in said piping system for prohibiting flow of brake fluid from said brake pressure generating member to said first and said second wheel braking force generating members while said pressure increase and decrease controlling means is controlling said brake pressure applied on at least one of said first and said second wheel braking force generating members;

a road coefficient of friction change determining means for determining occurrence of change of road coefficient of friction when a road on which a vehicle is running is shifted from a predetermined low friction coefficient road to a predetermined high friction coefficient road; and wherein said first wheel braking force generating member is communicated with said second wheel braking force generating member when said road coefficient of friction change determining means determines said occurrence of said change of said road coefficient of friction in executing control by said pressure increase and decrease controlling means.

18. The brake pressure controlling apparatus according to claim 17, wherein a pressure increase control by said pressure increase and decrease controlling means is set to operate by a predetermined pressure increase of said brake pressure applied on said respective wheel braking force generating members when said vehicle is running on a road having a predetermined uniform friction coefficient; and wherein said road coefficient of friction change determining means determines that said change of said road coefficient of friction is caused when pressure increase at said respective wheel braking force generating members in said pressure increase control is larger than said predetermined pressure increase.

19. The brake pressure controlling apparatus according to claim 17, wherein:

said first wheel is constituted by a front side wheel of said vehicle and said second wheel is constituted by a rear side wheel of said vehicle; and said piping system is an X piping system.

20. A brake pressure controlling apparatus comprising:

a brake pressure generating member generating brake pressure responsive to a braking operation by a passenger;

a first wheel braking force generating member generating a wheel braking force on a first wheel by receiving said brake pressure from said brake pressure generating member;

a second wheel braking force generating member generating said wheel braking force on a second wheel by receiving said brake pressure from said brake pressure generating member;

a piping system communicating said brake pressure generating member with said first and said second wheel braking force generating members;

a pressure increase and decrease controlling means for controlling increase and decrease of said brake pressure applied on at least one of said first and said second wheel braking force generating members;

a prohibiting member provided in said piping system for prohibiting flow of said brake fluid from said brake pressure generating member to said first and said second wheel braking force generating members when said pressure increase and decrease controlling means controls said brake pressure applied on at least one of said first and said second wheel braking force generating members;

a road state difference determining means for determining whether a difference of road states under a first wheel and a second wheel is reversed; and wherein said first wheel braking force generating member is communicated with said second wheel braking force generating member when said road state difference determining means determines a difference in executing control by said pressure increase and decrease controlling means.

21. The brake pressure controlling apparatus according to claim 20, wherein said road state difference determining means determines that said difference between said road states under said first wheel and said second wheel is reversed from a difference between a behavior of said first wheel and a behavior of said second wheel.

22. The brake pressure controlling apparatus according to claim 20, wherein said road state difference determining means determines that said difference between said road states of said first wheel and said second wheel is reversed when magnitudes of a wheel speed of said first wheel and a wheel speed of said second wheel are reversed.

23. The brake pressure controlling apparatus according to any one of claim 20, wherein said road state difference determining means determines that said difference between said road states under said first wheel and said second wheel is reversed when amounts of a slip state of said first wheel and a slip state of said second wheel are reversed.

24. The brake pressure controlling apparatus according to claim 23, wherein said road state difference determining means determines that said difference between said road states under said first wheel and said second wheel is reversed from a state of shifting of loads applied on said respective wheels.

25. A brake pressure controlling apparatus comprising:

a brake pressure generating member generating brake pressure in accordance with a braking operation;

a first wheel braking force generating member generating wheel braking force on a first wheel by receiving said brake pressure from said brake pressure generating member;

a second wheel braking force generating member arranged in a piping system which is the same as a piping system of said first wheel braking force generating member for generating said wheel braking force on a second wheel by receiving said brake pressure from said brake pressure generating member;

a pressure increase and decrease controlling means for controlling increase and decrease of said brake pressure applied to at least one of said first and said second wheel braking force generating members; and a pressure increasing means for increasing said brake pressure applied on one of said first and second wheel braking force generating members by high brake pressure applied on another of said first and second wheel braking force generating members in a state where a pressure difference is caused by said pressure increase and decrease controlling means between said brake pressure applied on said first wheel braking force generating member and said brake pressure applied on said second wheel braking force generating member in operating said pressure increase and decrease controlling means.

26. A brake pressure controlling apparatus comprising:

a master cylinder for generating brake pressure responsive to depression of a brake pedal by a passenger;

a master pressure cut-off valve arranged in a piping for transmitting said brake pressure from said master cylinder to a first wheel cylinder and a second wheel cylinder and for selectively communicating and blocking a flow path of brake fluid from said master cylinder;

a first control valve for communicating and blocking said flow path of said brake fluid from said master pressure cut-off valve to said first wheel cylinder;

a second control valve for communicating and blocking said flow path of said brake fluid from said master pressure cut-off valve to said second wheel cylinder;

a reservoir control valve arranged at a first piping connecting a second piping between said master pressure cut-off valve and said first and said second control valves with said reservoir for storing said brake fluid and for communicating and blocking a flow path of said brake fluid at said first piping;

an anti-skid controlling means for controlling increase and decrease of said brake pressure applied to said first and said second wheel cylinders by switching said master pressure cut-off valve, said first control valve, said second control valve and said reservoir control valve to predetermined positions when a slip state of said first and said second wheels becomes a predetermined amount or more; and determining means for determining a state wherein a difference is present between said brake pressures applied on said first wheel cylinder and said second wheel cylinder;

wherein said anti-skid controlling means is for bringing said reservoir control valve into a blocking state and for later bringing both of said first and said second control valves into a communicating state and for connecting said first wheel cylinder to said second wheel cylinder, thereby shifting said brake pressure from a high-pressure side of said first and said second wheel cylinders to a low-pressure side thereof when said determining means determines that said difference is present between said brake pressures applied to said first and said second wheel cylinders.

* * * * *